United States Patent
Umemoto

(10) Patent No.: US 11,113,951 B2
(45) Date of Patent: Sep. 7, 2021

(54) NOTIFICATION SYSTEM

(71) Applicant: PATLITE CORPORATION, Osaka (JP)

(72) Inventor: Takaya Umemoto, Osaka (JP)

(73) Assignee: PATLITE CORPORATION, Osaka (JP)

( * ) Notice: Subject to any disclaimer, the term of this patent is extended or adjusted under 35 U.S.C. 154(b) by 30 days.

(21) Appl. No.: 16/650,323

(22) PCT Filed: Sep. 28, 2018

(86) PCT No.: PCT/JP2018/036482
§ 371 (c)(1),
(2) Date: Mar. 24, 2020

(87) PCT Pub. No.: WO2020/065979
PCT Pub. Date: Apr. 2, 2020

(65) Prior Publication Data
US 2021/0225158 A1 Jul. 22, 2021

(51) Int. Cl.
*H04W 72/06* (2009.01)
*G08B 27/00* (2006.01)
*G08B 5/36* (2006.01)

(52) U.S. Cl.
CPC ............ *G08B 27/005* (2013.01); *G08B 5/36* (2013.01)

(58) Field of Classification Search
CPC .................................. G08B 27/005; G08B 5/36
See application file for complete search history.

(56) References Cited

U.S. PATENT DOCUMENTS 5,305,426 A 4/1994 Ushioda et al.
9,488,695 B2 * 11/2016 Simeth ............... G01R 31/3835
(Continued)

FOREIGN PATENT DOCUMENTS

DE 69120168 T2 2/1997
JP 2007-233579 A 9/2007
(Continued)

*Primary Examiner* — Munear T Akki
(74) *Attorney, Agent, or Firm* — Rabin & Berdo, P.C.

(57) ABSTRACT

A notification system includes a plurality of notification devices and a management computer. Each notification device includes a notification portion, an acceptance portion to accept information, a wireless communication unit, and a first CPU. The wireless communication unit receives a command transmitted from the management computer and transmits information corresponding to the accepted information to the management computer. The first CPU controls the notification portion to make a notification according to the accepted information and the received command. The management computer includes a first transmitting/receiving portion, a storage portion, and a second CPU. The second CPU applies the information which the first transmitting/receiving portion receives from the notification devices to a rule stored in the storage portion and determines the priority of the plurality of notification devices. The CPU transmits, to a notification device having the highest priority, a command to execute a highest priority notification indicating the highest priority of the notification device.

10 Claims, 20 Drawing Sheets

(56) References Cited

U.S. PATENT DOCUMENTS

| | | | |
|---|---|---|---|
| 2004/0135696 A1* | 7/2004 | Hasegawa | H02J 7/00036 340/636.1 |
| 2004/0196004 A1* | 10/2004 | Sasaki | H02J 7/007184 320/127 |
| 2004/0214613 A1* | 10/2004 | Shin | H04W 52/0225 455/567 |
| 2004/0257042 A1* | 12/2004 | Liu | H01M 10/441 320/130 |
| 2007/0203601 A1 | 8/2007 | Izumi et al. | |
| 2010/0109898 A1 | 5/2010 | Kensy et al. | |
| 2012/0249323 A1* | 10/2012 | McRae | G08C 17/00 340/539.11 |
| 2014/0347057 A1* | 11/2014 | Oh | G08C 17/02 324/426 |
| 2016/0254698 A1* | 9/2016 | Anderson | G01S 5/0284 320/101 |
| 2018/0220427 A1* | 8/2018 | Hwang | H04L 67/34 |

FOREIGN PATENT DOCUMENTS

| | | |
|---|---|---|
| JP | 2010-157213 A | 7/2010 |
| JP | 2013-196188 A | 9/2013 |
| JP | 2016-018242 A | 2/2016 |

\* cited by examiner

FIG. 3

| State information | Combined information ||
|---|---|---|
| | Display color | Detailed state code |
| Sixteenth information | Red | 6 |
| Fifteenth information | Red | 5 |
| Fourteenth information | Red | 4 |
| Thirteenth information | Red | 3 |
| Twelfth information | Red | 2 |
| Eleventh information | Red | 1 |
| Tenth information | Yellow | 6 |
| Ninth information | Yellow | 5 |
| Eighth information | Yellow | 4 |
| Seventh information | Yellow | 3 |
| Sixth information | Yellow | 2 |
| Fifth information | Yellow | 1 |
| Fourth information | Green | 4 |
| Third information | Green | 3 |
| Second information | Green | 2 |
| First information | Green | 1 |

|  | Identification information | Group |
|---|---|---|
| First notification device | F0F1F31F01A1 | First group |
| Second notification device | F0F1F31F01B2 | First group |
| Third notification device | F0F1F31F03A5 | First group |
| Fourth notification device | F0F1F31F0411 | Second group |
| Fifth notification device | F0F1F31F039A | Second group |
| Sixth notification device | F0F1F31F4AC8 | Second group |
| Seventh notification device | F0F1F31F56AD | Third group |
| Eighth notification device | F0F1F31F36A7 | Third group |

| Combined information | | Abnormal level |
|---|---|---|
| Display color | Detailed state code | |
| Red | 6 | 10 |
| Red | 5 | 9 |
| Red | 4 | 8 |
| Red | 3 | 7 |
| Red | 2 | 6 |
| Red | 1 | 6 |
| Yellow | 6 | 5 |
| Yellow | 5 | 4 |
| Yellow | 4 | 3 |
| Yellow | 3 | 3 |
| Yellow | 2 | 2 |
| Yellow | 1 | 1 |
| Green | 4 | 0 |
| Green | 3 | 0 |
| Green | 2 | 0 |
| Green | 1 | 0 |

FIG. 7

| Group | Abnormal level | Priority level |
|---|---|---|
| First group | 10 | 23 |
| | 9 | 22 |
| | 8 | 21 |
| | 7 | 20 |
| | 6 | 19 |
| | 5 | 18 |
| | 4 | 17 |
| | 3 | 16 |
| | 2 | 15 |
| | 1 | 14 |
| Second group | 10 | 16 |
| | 9 | 15 |
| | 8 | 14 |
| | 7 | 13 |
| | 6 | 12 |
| | 5 | 11 |
| | 4 | 10 |
| | 3 | 9 |
| | 2 | 8 |
| | 1 | 7 |
| Third group | 10 | 10 |
| | 9 | 9 |
| | 8 | 8 |
| | 7 | 7 |
| | 6 | 6 |
| | 5 | 5 |
| | 4 | 4 |
| | 3 | 3 |
| | 2 | 2 |
| | 1 | 1 |

FIG. 8

| | Combined information | | Lighting pattern | State duration time | Response state | |
|---|---|---|---|---|---|---|
| | Display color | Detailed state code | | | | |
| First notification device | Yellow | 3 | Normal lighting | 9 minutes | Not started | Priority level 16 (first) |
| Second notification device | Green | 2 | Normal lighting | 1 hour 13 minutes | Not started | |
| Third notification device | Yellow | 1 | Normal lighting | 1 hour 13 minutes | Not started | Priority level 14 (third) |
| Fourth notification device | Green | 1 | Normal lighting | 1 hour 35 minutes | Not started | |
| Fifth notification device | Green | 1 | Normal lighting | 1 hour 35 minutes | Not started | |
| Sixth notification device | Red | 6 | Normal lighting | 7 minutes | Not started | Priority level 16 (second) |
| Seventh notification device | Yellow | 2 | Normal lighting | 15 minutes | Not started | |
| Eighth notification device | Red | 4 | Normal lighting | 10 minutes | Starting | Priority level 2 (fourth) |

| | Combined information | | Lighting pattern | State duration time | Response state |
|---|---|---|---|---|---|
| | Display color | Detailed state code | | | |
| First notification device | Yellow | 3 | Flashing | 9 minutes | Not started |
| Second notification device | Green | 2 | Normal lighting | 1 hour 13 minutes | Not started |
| Third notification device | Yellow | 1 | Normal lighting | 1 hour 13 minutes | Not started |
| Fourth notification device | Green | 1 | Normal lighting | 1 hour 35 minutes | Not started |
| Fifth notification device | Green | 1 | Normal lighting | 1 hour 35 minutes | Not started |
| Sixth notification device | Red | 6 | Blinking | 7 minutes | Not started |
| Seventh notification device | Yellow | 2 | Normal lighting | 15 minutes | Not started |
| Eighth notification device | Red | 4 | Normal lighting | 10 minutes | Starting |

39

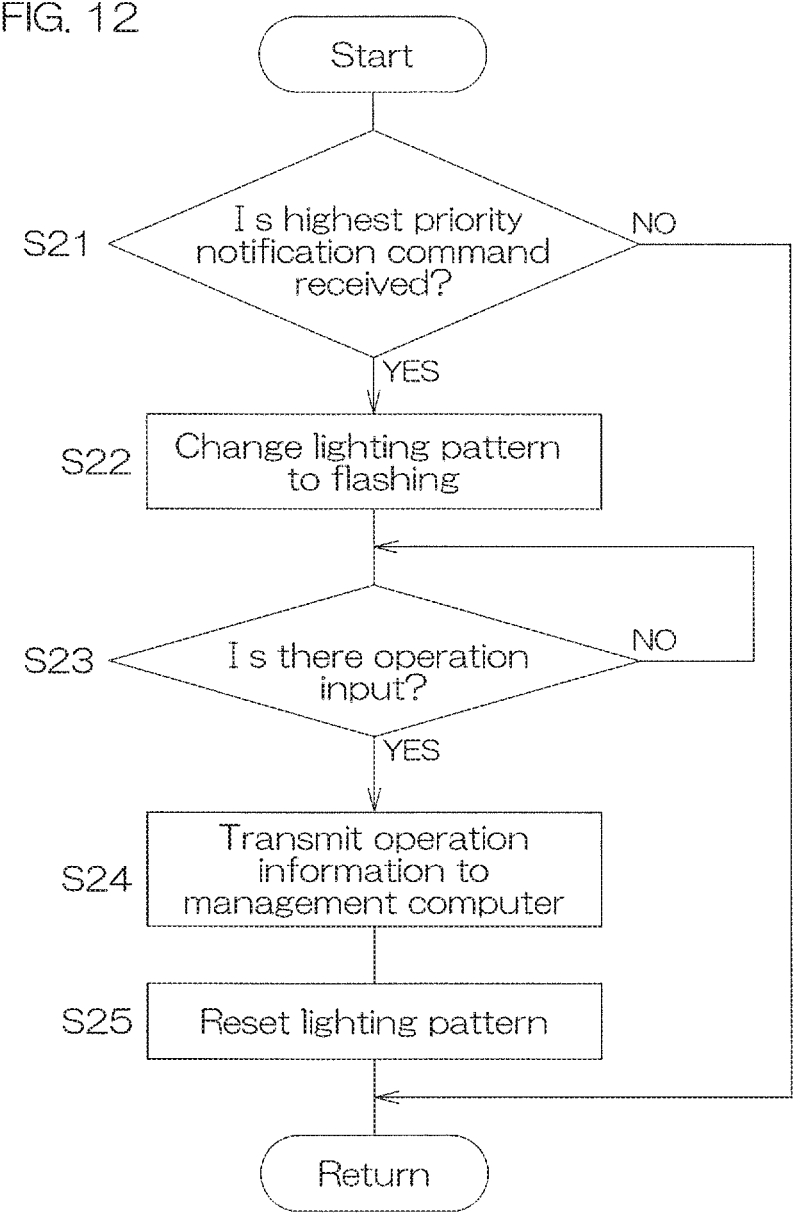

FIG. 17

| | | Display color | Detailed state code | Master-slave relationship | Priority level corrected value |
|---|---|---|---|---|---|
| First pattern | Third notification device | Yellow | 1 | Master | — |
| | First notification device | Yellow | 3 | Slave | 3 |
| | Second notification device | Red | 2 | Slave | 0 |
| Second pattern | Sixth notification device | Yellow | 2 | Master | — |
| | Fifth notification device | Red | 3 | Slave | 0 |

40

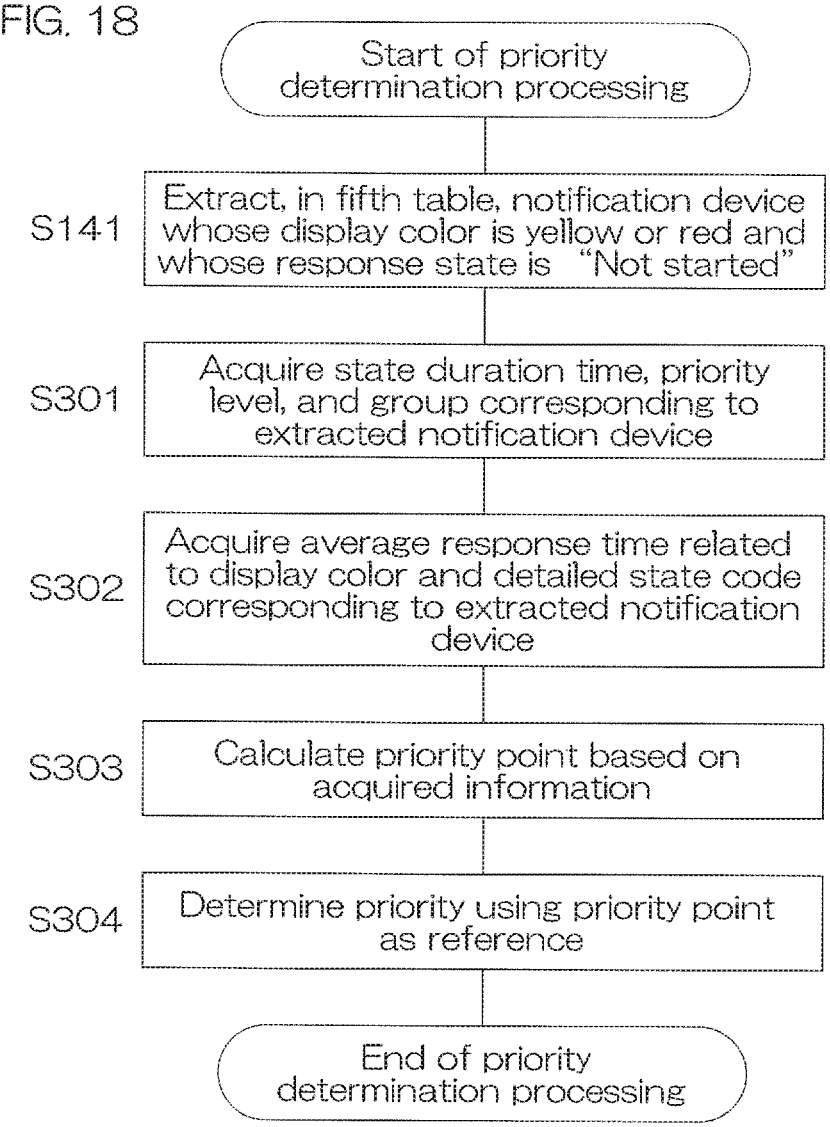

FIG. 19

| Date and time | Notification device | Display color | Detailed state code | Response state |
|---|---|---|---|---|
| 2018/8/9 13:00 | First notification device | Red | 3 | Not started |
| 2018/8/9 13:07 | First notification device | Red | 3 | Starting |
| 2018/8/9 13:20 | Fourth notification device | Red | 2 | Not started |
| 2018/8/9 13:25 | Fourth notification device | Red | 2 | Starting |
| 2018/8/9 13:43 | First notification device | Green | 1 | Not started |
| 2018/8/9 13:50 | Fifth notification device | Yellow | 3 | Not started |
| ..... | ..... | ..... | ..... | ..... |

Response time (bracket spanning Detailed state code and Response state)

| Notification device | Display color | Detailed state code | Average response time |
|---|---|---|---|
| First notification device | Red | 6 | 20 minutes |
| First notification device | Red | 5 | 41 minutes |
| First notification device | Red | 4 | 18 minutes |
| First notification device | Red | 3 | 22 minutes |
| First notification device | Red | 2 | 15 minutes |
| First notification device | Red | 1 | 25 minutes |
| First notification device | Yellow | 6 | 6 minutes |
| First notification device | Yellow | 5 | 11 minutes |
| First notification device | Yellow | 4 | 9 minutes |
| First notification device | Yellow | 3 | 10 minutes |
| First notification device | Yellow | 2 | 7 minutes |
| First notification device | Yellow | 1 | 7 minutes |
| Second notification device | Red | 6 | 18 minutes |
| Second notification device | Red | 5 | 38 minutes |
| Second notification device | Red | 4 | 19 minutes |
| ⋮ | ⋮ | ⋮ | ⋮ |

NOTIFICATION SYSTEM

TECHNICAL FIELD

The present invention relates to a notification system including a plurality of notification devices.

BACKGROUND ART

Patent Literature 1 discloses a configuration in which a plurality of signal columns are connected to a central signal column. The plurality of signal columns other than the central signal column are respectively installed to a plurality of technical devices to be monitored. These signal columns include a red lighting unit to light up in red when the corresponding technical device is in a critical state. The central signal column is located far away from the other signal columns. The central signal column includes a plurality of red exchange modules. These red exchange modules correspond one-to-one to the signal columns of the plurality of technical devices. When the red lighting unit of the signal column of the technical device lights up in red, the red exchange module corresponding to the signal column in the red lighting state lights up in red in the central signal column.

CITATION LIST

Patent Literature

Patent Literature 1: Japanese Patent Application Publication No. 2010-157213

SUMMARY OF INVENTION

Technical Problem

With the configuration of Patent Literature 1, a supervisor at a production site, etc., can identify a technical device in which an event requiring action has occurred by observing lighting states of the plurality of red exchange modules in the central signal column and can give instructions to a worker to handle the event. However, when such an event occurs simultaneously in a plurality of technical devices, it is difficult to determine from which technical device the event should be handled. Furthermore, the supervisor determines an order of responses to a plurality of events and then gives instructions to the worker based on this order. Therefore, it takes time for the worker to start to handle each event. Further, if the order of responses is not determined, responses to more critical events may be postponed. Thus, the operating efficiency of the entire production site may be reduced.

Accordingly, a preferred embodiment of the present invention provides a notification system capable of promptly and properly providing information on the priority.

Solution to Problem

The present invention provides a notification system including a plurality of notification devices and a management computer communicatively connected to the plurality of notification devices. Each notification device includes a notification portion, an information accepting means to accept an information input, a command receiving means to receive a command transmitted from the management computer, a notification control means, and a transmitting means. The notification control means controls the notification portion to make a notification according to the information which the information accepting means has accepted and the command which the command receiving means has received. The transmitting means transmits information corresponding to the information which the information accepting means has accepted to the management computer. The management computer includes a receiving means, a storing means, a determining means, and a commanding means. The receiving means receives information having been transmitted by the transmitting means of the plurality of notification devices. The storing means stores a rule for determining the priority of the plurality of notification devices. The determining means applies the information which the receiving means has received to the rule and determines the priority of the plurality of notification devices. The commanding means transmits to a notification device having been given the highest priority by the determining means a highest priority notification command to order an execution of a highest priority notification indicating that the notification device is the highest priority notification device.

With this configuration, in each notification device, when the information accepting means accepts an input of information in response to, for example, an occurrence of some event, the notification control means controls the notification portion to make a notification according to the information. Thus, a person who has received the notification can grasp the occurrence of the event. The transmitting means then transmits information corresponding to the information to the management computer. In the management computer, when the receiving means receives the information having been transmitted by the transmitting means of the plurality of notification devices, the determining means applies the information to the rule having been stored in the storing means and determines the priority of the plurality of notification devices. The commanding means then transmits the highest priority notification command to the notification device having been given the highest priority by the determining means. In the notification device having received the highest priority notification command by the command receiving means, the notification control means controls the notification portion to make a notification according to the highest priority notification command, and thus, the notification portion executes a highest priority notification indicating that the notification device is the highest priority notification device. Therefore, for example, when a plurality of events requiring action occurs simultaneously, the worker can grasp by the highest priority notification without instructions from a supervisor that the event related to the highest priority notification device should be handled with the highest priority. Thus, the worker can immediately set about handling the event. In this way, the notification system capable of promptly and properly providing information on the priority can be realized.

In a preferred embodiment of the present invention, the rule is defined to rank the plurality of notification devices based on the information which the transmitting means of the notification devices transmits to the management computer.

With this configuration, the determining means of the management computer applies the information having been transmitted by the transmitting means of the plurality of notification devices to the rule, to rank the notification devices, and thus can determine the priority of the plurality of notification devices. Accordingly, the plurality of notification devices is properly ranked based on the information which the information accepting means of the plurality of notification devices accepts, and the information on the priority can be provided properly.

In a preferred embodiment of the present invention, the information which the transmitting means of the notification devices transmits to the management computer includes information capable of specifying a degree of urgency. The rule is defined to rank the plurality of notification devices based on the information on the degree of urgency.

With this configuration, the determining means of the management computer applies the information on the degree of urgency specified from the information having been transmitted by the transmitting means of the plurality of notification devices to the rule, to rank the plurality of notification devices. Thereby, the determining means can properly determine the priority of the plurality of notification devices according to the degree of urgency, so that proper information on the priority can be provided.

In a preferred embodiment of the present invention, the management computer classifies the plurality of notification devices so that each notification device belongs to any of a plurality of groups. The information which the transmitting means of the notification devices transmits to the management computer includes information capable of specifying the groups to which the notification devices belong. The rule is defined to rank the plurality of notification devices based on the group to which each notification device belongs.

With this configuration, the determining means of the management computer specifies the group to which each notification device belongs from the information having been transmitted by the transmitting means of the plurality of notification devices and ranks the plurality of notification devices based on the specified group. Thereby, the determining means can properly determine the priority of the plurality of notification devices according to the group to which each notification device belongs.

In a preferred embodiment of the present invention, the storing means stores a combination of information indicating a plurality of abnormalities having a causal relationship out of the information which the transmitting means of the plurality of notification devices transmit. When the information which the receiving means has received from the transmitting means of the plurality of notification devices is information indicating a plurality of abnormalities having a causal relationship, the rule is defined to rank the plurality of notification devices based on the causal relationship.

With this configuration, the determining means of the management computer ranks the plurality of notification devices based on the causal relationship between abnormalities specified from the information having been transmitted by the transmitting means of the plurality of notification devices. Thereby, the determining means can properly determine the priority of the plurality of notification devices according to the causal relationship between abnormalities.

In a preferred embodiment of the present invention, when the commanding means has transmitted the highest priority notification command to any notification device, the commanding means transmits to at least one notification device other than the highest priority notification device a highest priority existence notification command to order an execution of a highest priority existence notification indicating the existence of the highest priority notification device.

With this configuration, in the notification device having received the highest priority existence notification command by the command receiving means, the notification control means controls the notification portion to make a notification according to the highest priority existence notification command. Thus, the notification portion executes the highest priority existence notification indicating the existence of the highest priority notification device. A worker, etc., who comes in contact with the highest priority existence notification learns that the highest priority notification has been made by another notification device. Accordingly, the fact that the highest priority notification has been made can be informed to a worker, etc., who has not come in contact with the highest priority notification by the highest priority notification device. Thereby, an early response, etc., to the event notified by the highest priority notification device can be promoted.

In a preferred embodiment of the present invention, the notification device further includes an operation input accepting means to accept an operation input to an operation switch operated by an operator. The transmitting means of the notification device transmits predetermined operation information to the management computer when the operation input accepting means of the notification device accepts the operation input. When the receiving means of the management computer has received the operation information from the highest priority notification device, the commanding means cancels the highest priority notification command with respect to the highest priority notification device and the determining means excludes the highest priority notification device and determines the priority of the plurality of notification devices.

With this configuration, when an operator such as a worker arrives at the highest priority notification device in order to handle the event related to the highest priority notification device and operates the operation switch, for example, the operation input accepting means accepts the operation input to the operation switch and the transmitting means transmits the operation information to the management computer in the highest priority notification device. In the management computer, when the receiving means receives the operation information from the highest priority notification device, the commanding means cancels the highest priority notification command with respect to the highest priority notification device and the determining means excludes the highest priority notification device and predetermines the priority of the plurality of notification devices. Thereby, when an event to be notified by priority is occurring simultaneously in the plurality of notification devices, for example, another notification device makes a highest priority notification instead of the notification device having been the highest priority notification device until just before. Therefore, the worker can grasp the highest priority notification device to be handled, etc., next by this highest priority notification. Thus, the worker can immediately set about handling, etc., the event related to this highest priority notification device.

In a preferred embodiment of the present invention, the commanding means transmits to a notification device having been given a lower priority than the highest priority by the determining means a next priority notification command to order an execution of a next priority notification indicating that the notification device is the next priority notification device.

With this configuration, in the notification device having received the next priority notification command by the command receiving means, the notification control means controls the notification portion to make a notification according to the next priority notification command. Thus, the notification portion executes the next priority notification indicating that the notification device is the next priority notification device. Therefore, the worker can grasp that the highest priority notification device exists aside from the notification device executing the next priority notification. Thereby, the worker can find the highest priority notification device and more immediately set about handling, etc., the event related to the highest priority notification device. Since the worker has grasped the existence of the next priority notification device, the worker can immediately set about handling, etc., the event related to the next priority notification device after handling, etc., the event related to the highest priority notification device. In this way, the worker can handle events, etc., in order of highest priority.

In a preferred embodiment of the present invention, the notification portion includes a display portion to variably display information. The notification control means of the notification device having received the highest priority notification command controls the display portion to display the information which the information accepting means has accepted with a first display attribute and display the highest priority notification with a second display attribute different from the first display attribute.

With this configuration, the information which the information accepting means has accepted and the highest priority notification are displayed with the mutually different display attributes on the display portion of the notification device having received the highest priority notification command. Accordingly, a person who has seen the display portion of the highest priority notification device can distinctively visually recognize both the information which the information accepting means has accepted and the highest priority notification.

In a preferred embodiment of the present invention, when the information which the receiving means has received is information indicating an abnormality, the determining means executes a determination of the priority of the plurality of notification devices.

With this configuration, in the management computer, the determining means updates the priority when the receiving means receives information in response to the occurrence of the abnormality. Thus, the notification device having become the highest priority notification device based on the updated priority executes the highest priority notification, thereby the worker can immediately set about handling, etc., the event related to the highest priority notification device having been properly determined according to the latest situation.

BRIEF DESCRIPTION OF DRAWINGS

FIG. 3 is a diagram showing a first table stored in a notification device constituting the notification system.

FIG. 5 is a diagram showing a second table stored in a management computer constituting the notification system.

FIG. 6 is a diagram showing a third table stored in the management computer.

FIG. 7 is a diagram showing a fourth table stored in the management computer.

FIG. 8 is a diagram showing a fifth table stored in the management computer.

FIG. 11 is a diagram showing the fifth table having been updated after the priority determination processing.

FIG. 12 is a flowchart for explaining an operation example of the notification device.

FIG. 17 is a diagram showing a sixth table stored in the management computer in connection with the priority determination processing according to the first modification.

FIG. 18 is a flowchart for explaining a priority determination processing according to a second modification.

FIG. 19 is a diagram showing a seventh table stored in a storage device in connection with the priority determination processing according to the second modification.

FIG. 20 is a diagram showing an eighth table stored in the management computer in connection with the priority determination processing according to the second modification.

DESCRIPTION OF EMBODIMENTS

Figure 1:
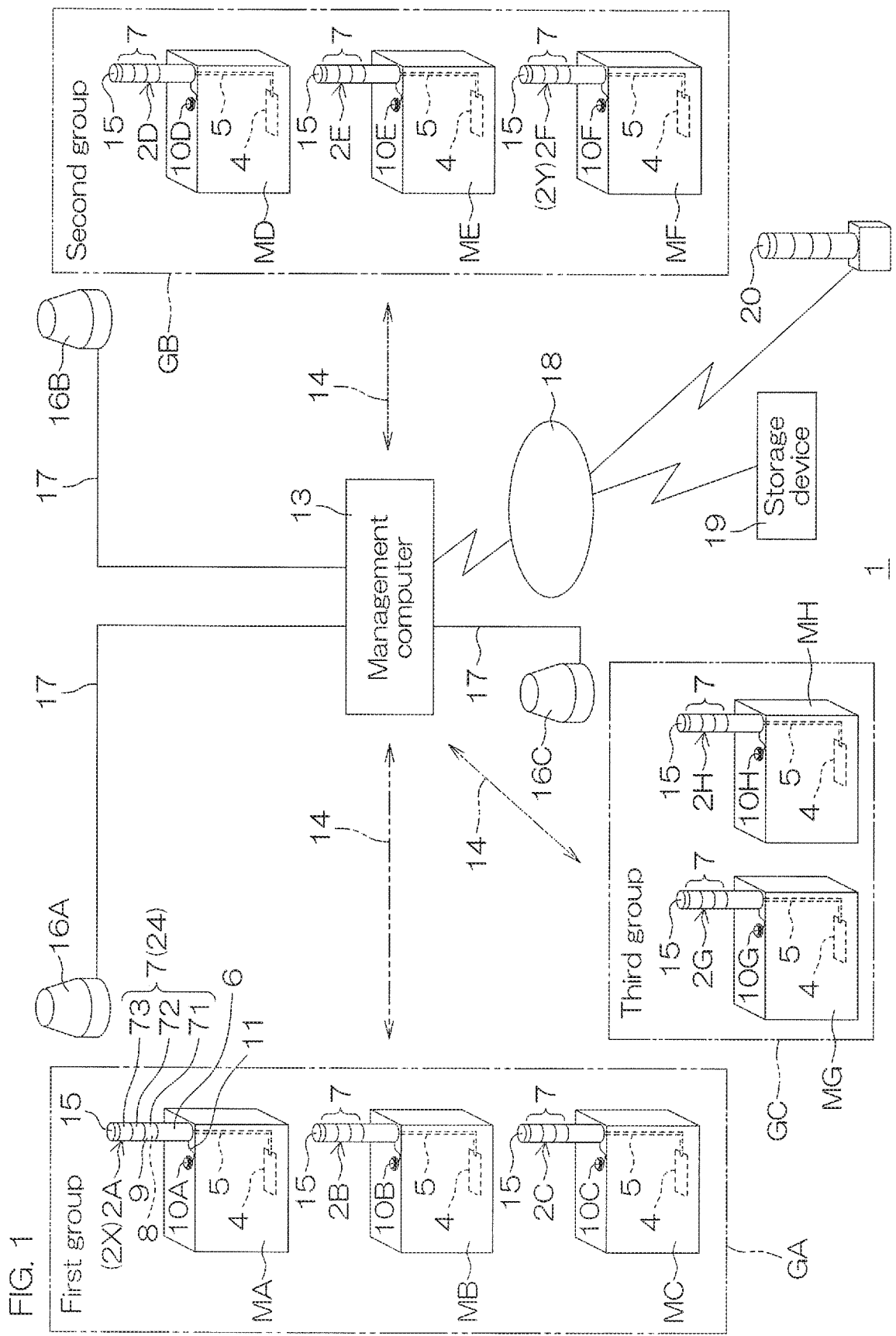
FIG. 1 is a schematic diagram showing a configuration of a notification system according to a preferred embodiment of the present invention.

FIG. 1 is a schematic diagram showing a configuration of a notification system 1 according to a preferred embodiment of the present invention. The notification system 1 is provided, for example, at a production site of a factory. At the production site, a first mechanical device MA, a second mechanical device MB, a third mechanical device MC, a fourth mechanical device MD, a fifth mechanical device ME, a sixth mechanical device MF, a seventh mechanical device MG, and an eighth mechanical device MH (hereinafter, referred to as "mechanical device M" when collectively referred to) are installed. The number of the mechanical devices M can be changed optionally. In this preferred embodiment, the plurality of mechanical devices M is grouped into any of a first group GA to a third group GC (hereinafter, referred to as "group G" when collectively referred to). Specifically, the first mechanical device MA, the second mechanical device MB, and the third mechanical device MC constitute the first group GA. The fourth mechanical device MD, the fifth mechanical device ME, and the sixth mechanical device MF constitute the second group GB. The seventh mechanical device MG and the eighth mechanical device MH constitute the third group GC. The plurality of mechanical devices M belonging to the same group G are adjacently located in this preferred embodiment, however, these may be located apart at a predetermined distance between the mechanical devices M.

The notification system 1 includes a first notification device 2A to an eighth notification device 2H (hereinafter, referred to as "notification device 2" when collectively referred to) respectively installed to the first mechanical device MA to the eighth mechanical device MH. The notification device 2 is connected to a control device 4 controlling the mechanical device M associated with the notification device 2, through a wired or wireless input signal line 5. The control device 4 may be a programmable logic controller (PLC) controlling the operation of the corresponding mechanical device M. Information output from the control device 4 is periodically input to the notification device 2 through the input signal line 5. This information is a signal indicating a state of the corresponding mechanical device M (for example, during normal operation or an occurrence of a failure, a shortage of parts, or other abnormalities). This information (hereinafter, referred to as "state information") includes a plurality of types (16 types from the first information to the sixteenth information in this preferred embodiment) according to an event that may occur in the mechanical device M (not necessarily a failure). Each notification device 2 belongs to a group G to which a mechanical device M associated with the notification device 2 belongs. Therefore, the first notification device 2A, the second notification device 2B, and the third notification device 2C belong to the first group GA, and the fourth notification device 2D, the fifth notification device 2E, and the sixth notification device 2F belong to the second group GB, and the seventh notification device 2G and the eighth notification device 2H belong to the third group GC. Each notification device 2 is assigned with identification information. The identification information of each notification device 2 in this preferred embodiment is a physical address such as a MAC address (Media Access Control address).

The notification device 2 in this preferred embodiment has a columnar basic form as a whole. With reference to the first notification device 2A, the notification device 2 includes a base 6 fixed in place in the mechanical device M and a display portion 7 supported by the base 6. The base 6 is formed in a columnar shape (typically a cylindrical shape). The display portion 7 is formed in a columnar shape (for example, a cylindrical shape) having a size and a shape matching the base 6. The display portion 7 includes a lower display portion 71 stacked on the base 6, a middle display portion 72 stacked on the lower display portion 71, and an upper display portion 73 stacked on the middle display portion 72. Such a notification device 2 is a so-called stacked signal light.

The lower display portion 71, the middle display portion 72, and the upper display portion 73 each include a light source 8 and a tubular (for example, cylindrical) globe 9 covering the periphery of the light source 8. The light source 8 in this preferred embodiment is a light-emitting diode. The globe 9 in this preferred embodiment is colorless and transparent, or white translucent, and emits light having been emitted from the light source 8 to the outside in the same color. The emission color of the light source 8 becomes the display color of the display portion 7. In this preferred embodiment, the display color of the lower display portion 71 is green, and the display color of the middle display portion 72 is yellow, and the display color of the upper display portion 73 is red. In the lower display portion 71, the middle display portion 72, and the upper display portion 73, the emission color of the light source 8 may be different according to each display color, or the emission color of the light source 8 may be the same color (for example, white) and the globe 9 may be colored with the corresponding display color. In each notification device 2, the light sources 8 of the lower display portion 71, the middle display portion 72, and the upper display portion 73 do not emit light simultaneously. The light source 8 of any one of the lower display portion 71, the middle display portion 72, and the upper display portion 73 selectively emits light. The display portion 7 of the notification device 2 variably displays information such as the operating state of the mechanical device M associated with the notification device 2 by the display color or a lighting pattern. The lighting pattern of the display portion 7 includes normal lighting (continuous lighting), blinking, and flashing. The blinking means a lighting pattern periodically repeating a fixed short-time lighting and a fixed short-time extinguishing. The flashing means a lighting pattern periodically repeating a fixed extremely short-time lighting (a lighting for a shorter time than in the case of blinking) and a subsequent fixed short-time extinguishing (an extinguishing for a longer time than the lighting time).

The state information input from the control device 4 to the notification device 2 includes a plurality of types (three types according to green, yellow, and red in this preferred embodiment) of color information for specifying the display color of the display portion 7 and a detailed state code composed of any number of, for example, 1 to 6. The state information is subdivided into the above-described first information to sixteenth information by combination of the color information and the detailed state code. A large number of detailed state codes can be set according to an amount of information of the detailed state codes that can be input from the control device 4 to the notification device 2. When the information amount is 8 bits, the detailed state code can be set in a range of 0 to 255.

The notification system 1 further includes a first operation switch 10A to an eighth operation switch 10H (hereinafter, referred to as "operation switch 10" when collectively referred to) respectively located on the periphery of the first notification device 2A to the eighth notification device 2H. The operation switch 10 is operated by an operator such as a maintenance worker in charge of maintenance at the production site. The operation switch 10 is connected to the corresponding notification device 2 through a signal line 11. As the operation switch 10, a capacitance type touch sensor can be used. Although the operation switch 10 is located at a position away from the notification device 2 in this preferred embodiment, it may be integrated with the notification device 2. The operation switch 10 in this preferred embodiment is pressed (more specifically, touched) by the operator's hand. On the other hand, the operation switch 10 at the time of being located at the position away from the notification device 2 may be a foot switch operated by the operator's stepping on it. Each time the operator presses the operation switch 10, the operation switch 10 generates information and inputs the information to the corresponding notification device 2. One example of the information is a pulse signal.

The notification system 1 further includes a management computer 13 to manage the plurality of notification devices 2. The management computer 13 is provided with at least an input portion (not shown) such as a setting switch. The management computer 13 may be a personal computer provided with an input portion (not shown) configured by a keyboard, etc., instead of the setting switch and a display portion (not shown) such as a monitor. Each notification device 2 is communicatively connected to the management computer 13 through a wired or wireless first network 14. As the first network 14, a communication line by a connection technique such as an IO-Link can be used. In this preferred embodiment, the first network 14 is wirelessly configured. Accordingly, the notification device 2 includes a wireless communication unit connected to the first network 14. The wireless communication unit 15 is provided, for example, on the display portion 7. The information each notification device 2 has is transmitted from the wireless communication unit 15 to the management computer 13 through the first network 14. A command from the management computer 13 is transmitted through the first network 14 to the notification device 2 targeted for this command.

The notification system 1 further includes a first notification apparatus 16A to a third notification apparatus 16C (hereinafter, referred to as "notification apparatus 16" when collectively referred to) respectively located on the periphery of the first group GA to the third group GC. As the notification apparatus 16, any alarm unit can be used. The notification apparatus 16 may be a stacked signal light similar to the notification device 2. The notification apparatus 16 is connected to the management computer 13 through a wired or wireless input signal line 17. The notification apparatus 16 issues an alarm by at least either light emission or sound according to a notification command having been transmitted from the management computer 13.

The notification system 1 further includes a storage device 19 and a network notification apparatus 20 communicatively connected to the management computer 13 through a wired or wireless second network 18. As the second network 18, a LAN (Local Area Network) can be used. The storage device 19 is a computer (typically a personal computer) provided with a display portion (not shown) such as a monitor and an input portion (not shown) such as a keyboard. The storage device 19 stores, as a history, the information which the management computer 13 has received from the notification device 2, etc. This history includes an operation history of each notification device 2. As the network notification apparatus 20, any alarm unit can be used similar to the notification apparatus 16. The network notification apparatus 20 is located at a place away from the mechanical device M (may be outside the production site). The network notification apparatus 20 issues an alarm by at least either light emission or sound according to a notification command having been transmitted from the management computer 13.

Figure 2:
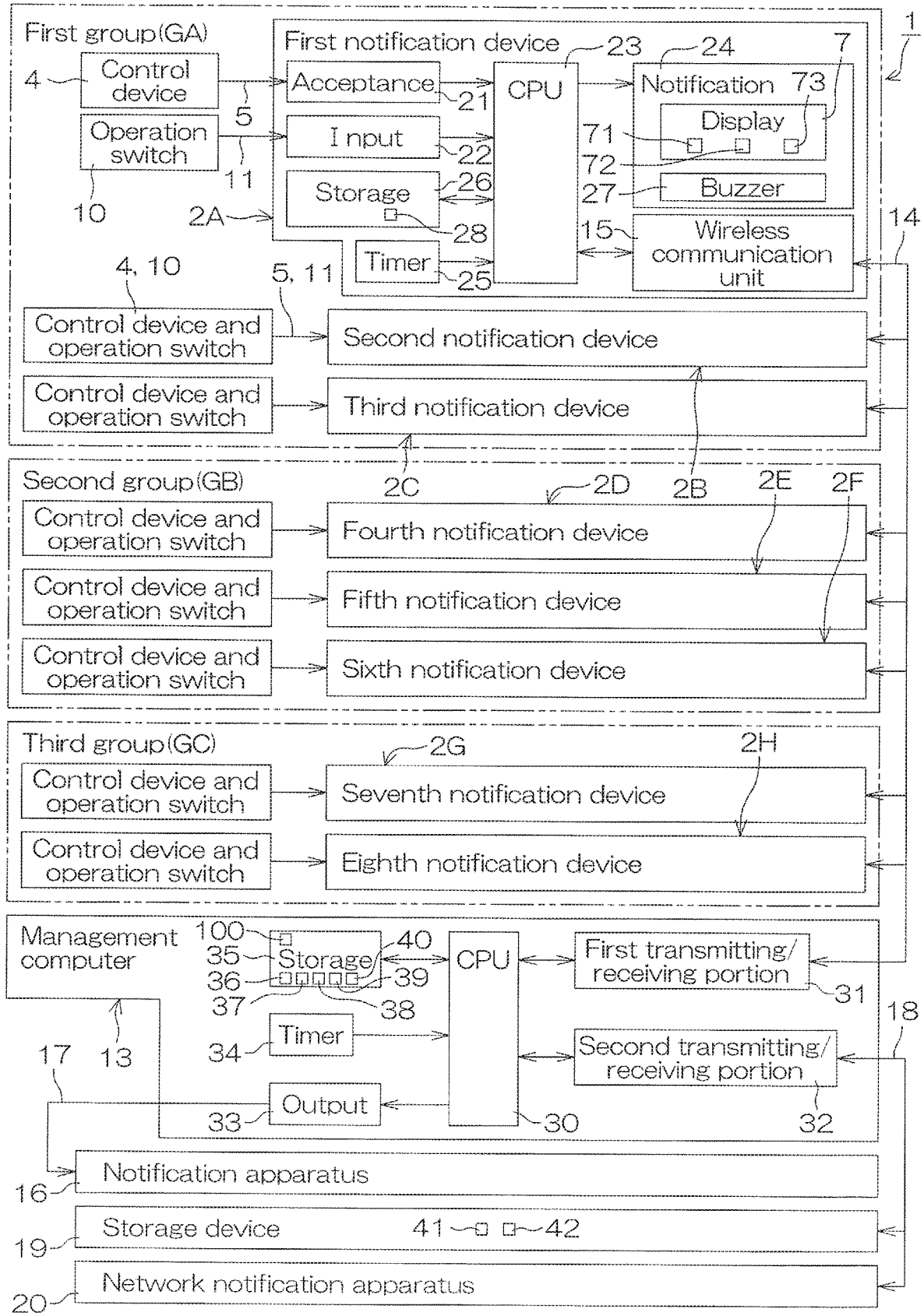
FIG. 2 is a block diagram showing an example of an electrical configuration of the notification system.

FIG. 2 is a block diagram showing an example of an electrical configuration of the notification system 1. With reference to the first notification device 2A, each notification device 2 includes an acceptance portion 21 as an interface portion connected to the input signal line 5 connected to the corresponding control device 4, an input portion 22 as an interface portion connected to the signal line 11 connected to the corresponding operation switch 10, and the above-described wireless communication unit 15. The acceptance portion 21 functions as the information accepting means to accept an input of the state information from the control device 4. The input portion 22 functions as the operation input accepting means to accept an operation input of the operation switch 10. The wireless communication unit 15 is an interface portion connected to the first network 14. The wireless communication unit 15 functions as the command receiving means to receive a command transmitted from the management computer 13 through the first network 14. The wireless communication unit 15 also functions as the transmitting means to transmit information corresponding to the information which the acceptance portion 21 has accepted to the management computer 13.

Each notification device 2 includes a CPU (Central Processing Unit) 23, a notification portion 24, a timer 25 to measure time, and a storage portion 26 to store information such as operation conditions of the notification device 2. The notification portion 24 includes the above-described display portion 7 and a buzzer 27 housed, for example, in the base 6. The CPU 23 functions as the notification control means. Therefore, the CPU 23 controls the notification portion 24 to make a notification according to the state information which the acceptance portion 21 has accepted from the control device 4 and the command which the wireless communication unit 15 has received. Details of control of the notification portion 24 by the CPU 23 will be described in detail later. The CPU 23 executes the processing with reference to the measured time of the timer 25 as needed.

A relationship among the state information which the acceptance portion 21 accepts from the control device 4, the display color corresponding to the color information included in the state information, and the detailed state code included in the state information are summarized in a first table 28 (see FIG. 3) and stored in the storage portion 26. Information in which the display color and the detailed state code are combined (hereinafter, referred to as "combined information") can specify which of the first information to the sixteenth information the state information of the corresponding mechanical device M is. That is, each combined information corresponds to any of the first information to the sixteenth information. In this preferred embodiment, the first information to the fourth information corresponding to the display color of green indicate that the mechanical device M is running normally or an event with a low degree of urgency is occurring in the mechanical device M. The fifth information to the tenth information corresponding to the display color of yellow indicate that an event with a higher degree of urgency than the first information to the fourth information is occurring in the mechanical device M. The eleventh information to the sixteenth information corresponding to the display color of red indicate that an abnormality with a higher degree of urgency than the fifth information to the tenth information is occurring in the mechanical device M. The fifth information to the sixteenth information are information indicating an abnormality. The abnormality indicated by the fifth information to the tenth information is, for example, that parts are likely to be short. The abnormality indicated by the eleventh information to the sixteenth information is, for example, that the mechanical device M has broken down or parts are out of stock.

Figure 4:
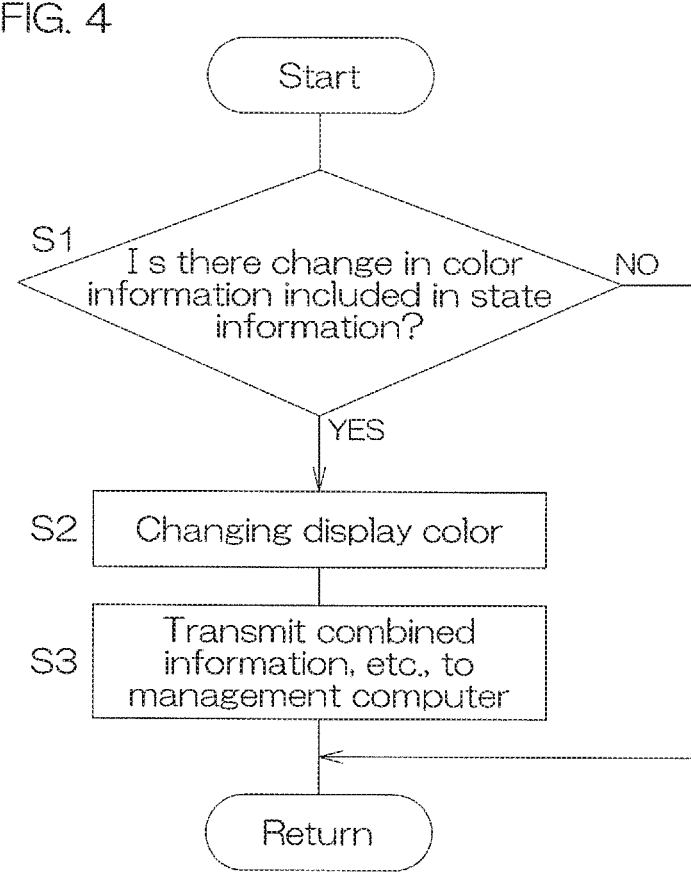
FIG. 4 is a flowchart for explaining an operation example of the notification device.

FIG. 4 is a flowchart for explaining an operation example of the notification device 2 (specifically, an operation example related to a change in the display color of the display portion 7). In each notification device 2, the acceptance portion 21 periodically accepts an input of the state information from the control device 4, and the CPU 23 controls the display portion 7 to display the latest state information which the acceptance portion 21 has accepted with the first display attribute. The first display attribute in this preferred embodiment is the display color of the display portion 7. As one example, when the latest state information which the acceptance portion 21 has accepted is the first information, the CPU 23 causes the light source 8 of the lower display portion 71 to continuously light up, thereby causing the display portion 7 to normally light up in green. When a change occurs in the state information input from the control device 4 with an occurrence of an event in the mechanical device M and the color information included in the state information also changes (Step S1: YES), the CPU 23 changes the display color of the display portion 7 (Step S2). Accordingly, when the state information which the acceptance portion 21 accepts changes, for example, from the first information to the fifth information, the CPU 23 extinguishes the light source 8 of the lower display portion 71 and causes the light source 8 of the middle display portion 72 to continuously light up, thereby causing the display portion 7 to normally light up in yellow. When the CPU 23 changes the display color of the display portion 7 whose lighting pattern is blinking or flashing, the lighting pattern of the display portion 7 is changed to normal lighting. The CPU 23 then transmits the combined information (the display color and the detailed state code) corresponding to the state information after the change and the identification information of the notification device 2 to the management computer 13 by the wireless communication unit 15 (Step S3).

With reference to FIG. 2, the management computer 13 includes a CPU 30, a first transmitting/receiving portion 31 as an interface portion connected to the first network 14, a second transmitting/receiving portion 32 as an interface portion connected to the second network 18, and an output portion 33 as an interface portion connected to the input signal line 17 connected to the notification apparatus 16. The first transmitting/receiving portion 31 functions as the receiving means to receive the information having been transmitted by the wireless communication units 15 of the first notification device 2A to the eighth notification device 2H. The management computer 13 includes a timer 34 to measure time and a storage portion 35 to store various information. The CPU 30 executes a processing with reference to the measured time of the timer 34 as needed. In the storage portion 35, a program for the processing which the CPU 30 executes is also stored.

FIG. 5 is a diagram showing a second table 36 stored in the storage portion 35 of the management computer 13. A relationship among the notification device 2, the identification information of the notification device 2, and the group G to which the notification device 2 belongs (any of the first group G1 to the third group GC) is summarized in the second table 36 as basic information of each notification device 2. Therefore, the management computer 13 classifies, in the second table 36, the plurality of notification devices 2 so that each notification device 2 belongs to any of the plurality of groups G. The information which the wireless communication unit 15 of the notification device 2 transmits to the management computer 13 includes the identification information of the notification device 2 as source information. Accordingly, the CPU 30 of the management computer 13 refers to the second table 36 based on the identification information included in the information having been received from the notification device 2, thereby the CPU 30 can specify which of the first notification device 2A to the eighth notification device 2H the notification device 2 is and specify the group G to which the notification device 2 belongs.

FIG. 6 is a diagram showing a third table 37 stored in the storage portion 35 of the management computer 13. An abnormal level, for example, from 0 to 10 is set for the combined information transmitted from the wireless communication unit 15 of each notification device 2 to the management computer 13. The degree of urgency of an event corresponding to the combined information for which an abnormal level being close to 10 (high) is set is high. The degree of urgency of an event corresponding to the combined information for which an abnormal level being close to 0 (low) is set is low. A relationship between the combined information and the abnormal level set in the combined information is summarized in the third table 37. The CPU 30 of the management computer 13 refers to the third table 37 based on the combined information having been received from the notification device 2, thereby the CPU 30 can specify the abnormal level, that is, the degree of urgency, of the event in the mechanical device M associated with the notification device 2.

FIG. 7 is a diagram showing a fourth table 38 stored in the storage portion 35 of the management computer 13. A priority level, for example, from 1 to 23 is set for the combination of the group G to which the notification device 2 belongs and the abnormal level of the event in the mechanical device M associated with the notification device 2. In an event corresponding to the combination for which a priority level being close to 23 (high) is set, the priority to be handled is high. In an event corresponding to the combination for which a priority level being close to 0 (low) is set, the priority to be handled is low. A relationship between the combination of the group G and the abnormal level and the priority level having been set for the combination is summarized in the fourth table 38. In this preferred embodiment, an event having an abnormal level of 4 to 10 in the mechanical device M belonging to the first group GA is set to have a higher priority than an event in the mechanical device M belonging to the second group GB. The priority level of an event having an abnormal level of 1 to 3 in the mechanical device M belonging to the first group GA is set to be the same respectively as the priority level of an event having an abnormal level of 8 to 10 in the mechanical device M belonging to the second group GB. An event having an abnormal level of 5 to 10 in the mechanical device M belonging to the second group GB is set to have a higher priority than an event in the mechanical device M belonging to the third group GC. The priority level of an event having an abnormal level of 1 to 4 in the mechanical device M belonging to the second group GB is set to be the same respectively as the priority level of an event having an abnormal level of 7 to 10 in the mechanical device M belonging to the third group GC.

The CPU 30 of the management computer 13 refers to the fourth table 38 based on the combination of the group G to which the notification device 2 corresponding to the event whose abnormal level has been specified belongs and the abnormal level. Thereby, the CPU 30 can specify the priority level of the event in the mechanical device M associated with the notification device 2.

FIG. 8 is a diagram showing a fifth table 39 stored in the storage portion 35 of the management computer 13. In the fifth table 39, the latest combined information each notification device 2 transmits to the management computer 13 and the lighting pattern are recorded. The CPU 30 of the management computer 13 measures by the timer 34 an elapsed time from a time when the combined information is received by the first transmitting/receiving portion 31 of the management computer 13, and records the measured elapsed time as a "state duration time" in the fifth table 39. In the fifth table 39, a state of response by the worker to the event in the mechanical device M associated with each notification device 2 is recorded. The response state at the time when a response to the event has not started yet is set to "not started," and the response state at the time when the worker is handling the event is set to "starting."

Figure 9:
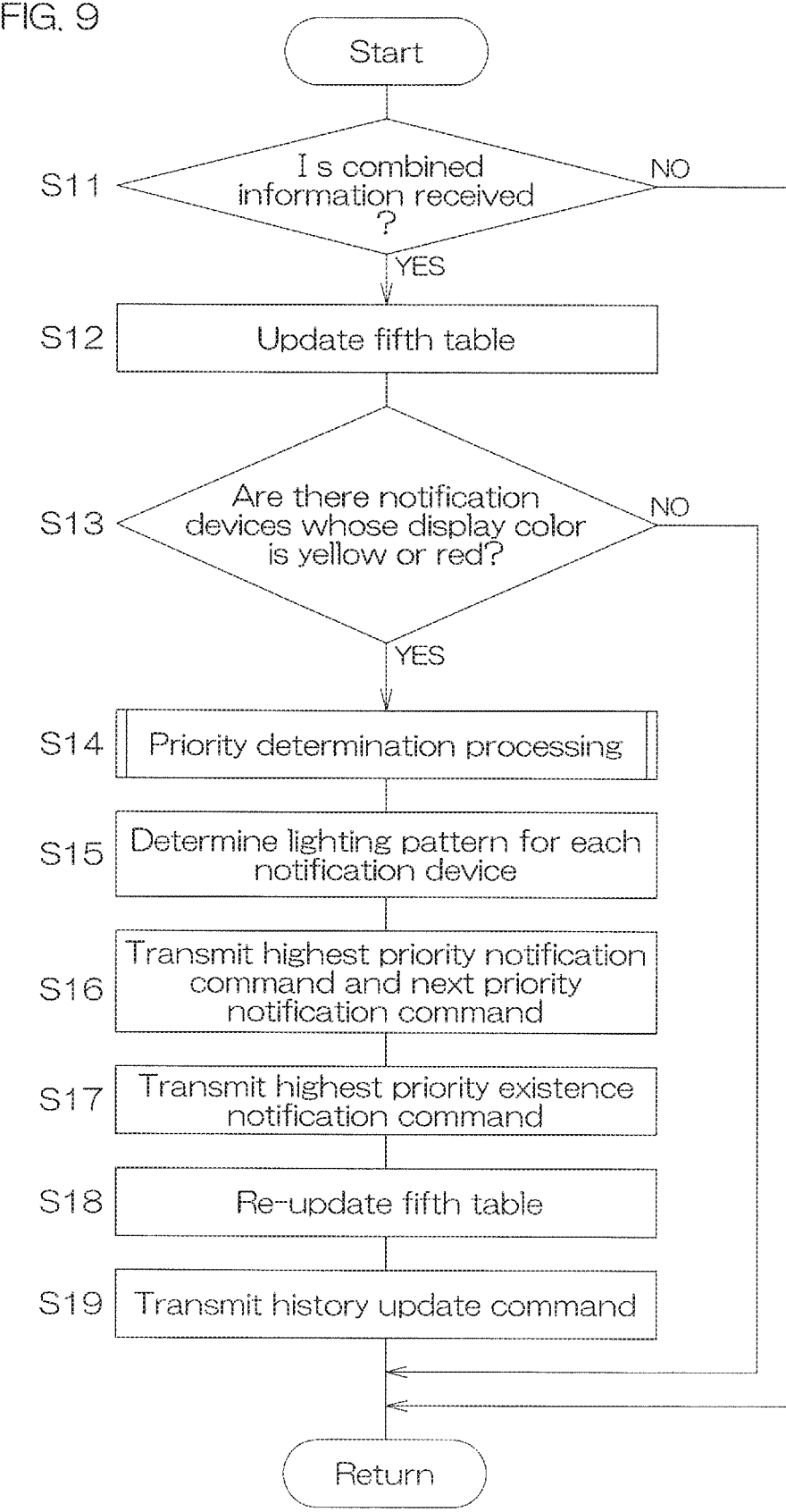
FIG. 9 is a flowchart for explaining an operation example of the management computer.

FIG. 9 is a flowchart for explaining an operation example of the management computer 13. In the management computer 13, when the first transmitting/receiving portion 31 receives the combined information from the notification device 2 (Step S11: YES), the CPU 30 updates the information on the notification device 2 in the fifth table 39 (Step S12). Specifically, the first transmitting/receiving portion 31 receives the identification information of the notification device 2 together with the combined information. Hereinafter, these pieces of information are referred to as "received information." The CPU 30 specifies the notification device 2 by the identification information. The CPU 30 then changes information different from the received information out of the breakdown of the combined information (the display color and the detailed state code) on the notification device 2 in the fifth table 39, to the latest information in the received information. The CPU 30 also sets the response state of the notification device 2 to "not started." The CPU 30 then resets the state duration time of the notification device 2. Thereby, the time measurement by the timer 34 is restarted from 0 seconds.

FIG. 8 shows one example of the fifth table 39 after the update. When there exists a notification device 2 whose display color is yellow or red, an abnormality is occurring in the mechanical device M associated with the notification device 2. When a plurality of such notification devices 2 exist, an abnormality is occurring in a plurality of mechanical devices M at the same time. When the CPU 30 confirms in the updated fifth table 39 that there exists a plurality of notification devices 2 whose display colors are yellow or red (Step S13: YES), that is, when information indicating abnormalities is included in the received information having been received from the notification devices 2, the CPU 30 executes a priority determination processing (Step S14). The priority determination processing is a processing for determining the order of abnormalities to be handled, in other words, the priority of the plurality of notification devices 2 notifying the occurrence of abnormality with the display color of yellow or red. There is a rule 100 for determining the priority of the plurality of notification devices 2. The storage portion 35 of the management computer 13 functions as a storing means to store the rule 100 (see FIG. 2). The rule 100 is defined to rank the plurality of notification devices 2 based on the combined information which the wireless communication units 15 of the notification devices 2 transmit to the management computer 13. The CPU 30 functions as a determining means to apply the combined information to the rule 100 and determine the priority of the plurality of notification devices 2.

Figure 10:
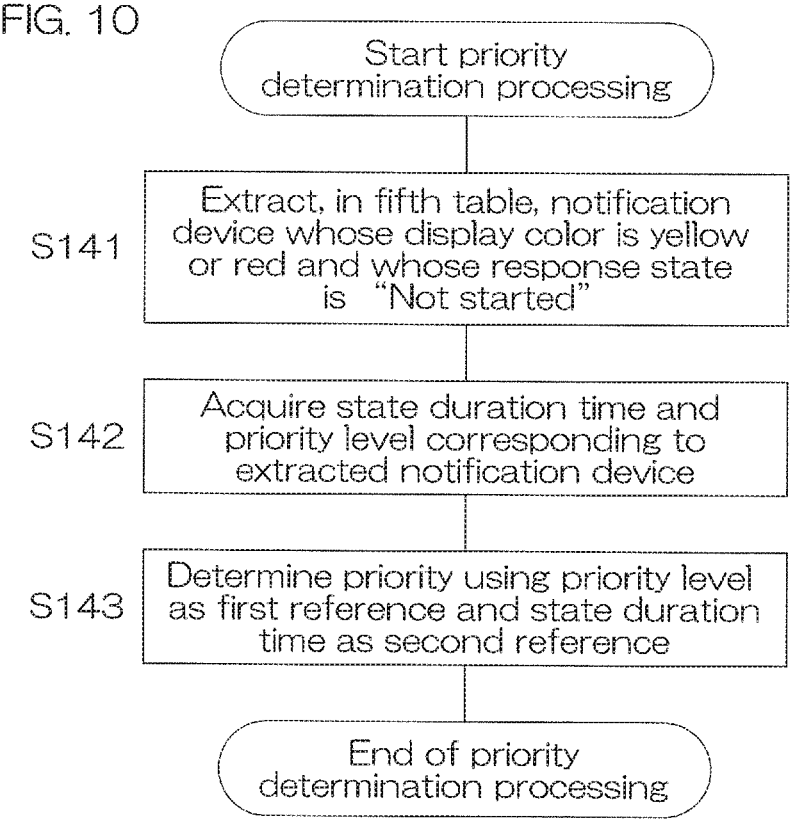
FIG. 10 is a flowchart for explaining a priority determination processing executed by the management computer.

FIG. 10 is a flowchart for explaining the priority determination processing. First, as the priority determination processing, the CPU 30 refers to the fifth table 39 and extracts a notification device 2 whose display color is yellow or red and whose response state is "not started" (Step S141). In the case of the fifth table 39 of FIG. 8, the first notification device 2A, the third notification device 2C, the sixth notification device 2F, and the seventh notification device 2G are extracted as targets to which the priority is given. On the other hand, the eighth notification device 2H whose display color is red but whose response state is "starting" is excluded from the extraction target since the response to the abnormality has already been started. Further, a notification device 2 whose state duration time exceeds a predetermined threshold may be excluded from the extraction target since the notification device 2 may be left unattended intentionally for some reason.

Next, the CPU 30 acquires the state duration times and the priority levels corresponding to the extracted notification devices 2 (Step S142). Specifically, the CPU 30 refers to the fifth table 39 and acquires the state duration times corresponding to the notification devices 2. For the acquisition of the priority levels, the CPU 30 acquires the combined information corresponding to the notification devices 2 from the fifth table 39, and specifies the groups G to which the notification devices 2 belong from the second table 36 (see FIG. 5). Then, the CPU 30 specifies the abnormal levels corresponding to the combined information from the third table 37 (see FIG. 6), and specifies the priority levels corresponding to the combinations of the abnormal levels and the groups G from the fourth table 38 (see FIG. 7). In the case of FIG. 8, as described at the right end of the fifth table 39, the priority level of the first notification device 2A is "16", and the priority level of the third notification device 2C is "14", and the priority level of the sixth notification device 2F is "16", and the priority level of the seventh notification device 2G is "2".

Next, the CPU 30 determines the priority of the plurality of notification devices 2 having been extracted this time using the priority level as the first reference and the state duration time as the second reference (Step S143). The first reference is a reference given priority over the second reference. In the case of FIG. 8, the CPU 30 determines the provisional ranking based on the priority level. The higher the priority level is, the higher the provisional ranking becomes. As a result, the provisional rankings of the first notification device 2A and the sixth notification device 2F are both the first, and the provisional ranking of the third notification device 2C is the third, and the provisional ranking of the seventh notification device 2G is the fourth. The CPU 30 then ranks the first notification device 2A and the sixth notification device 2F having the same provisional ranking based on the state duration time. In this preferred embodiment, the longer the state duration time is, the higher the priority becomes. As a result, the first notification device 2A having a longer state duration time is higher than the sixth notification device 2F. Therefore, the CPU 30 finally sets the priority of the first notification device 2A to the first (highest), sets the priority of the sixth notification device 2F to the second, sets the priority of the third notification device 2C to the third, and sets the priority of the seventh notification device 2G to the fourth (lowest).

In this way, the CPU 30 applies the combined information having been received from the notification devices 2 to the rule 100 that the notification device 2 having a higher priority level and a longer state duration time has a higher priority, and determines the priority of the plurality of notification devices 2. The priority level is determined based on the abnormal level related to the degree of urgency of the abnormality and the group G to which the notification device 2 belongs (see FIG. 7). Therefore, the rule 100 is defined to rank the plurality of notification devices 2 based on the abnormal level (the information on the degree of urgency of the abnormality) and the group G to which each notification device 2 belongs. The rule 100 may be defined to rank the plurality of notification devices 2 based on only the abnormal level, and may be defined to rank the plurality of notification devices 2 based on only the group G.

With reference to FIG. 9, the CPU 30 determines the lighting pattern of each notification device 2 whose priority has been determined (Step S15). As one example, the CPU 30 determines the lighting pattern of a notification device 2 having been given the highest priority (hereinafter, sometimes referred to as "highest priority notification device 2X") to be "flashing" and determines the lighting pattern of a notification device 2 having been given the second or subsequent priority (hereinafter, sometimes referred to as "next priority notification device 2Y") to be "blinking." Not only the second notification device 2 but also the third or subsequent notification device 2 can fall into the next priority notification device 2Y. The CPU 30 determines the lighting pattern of notification devices 2 other than the highest priority notification device 2X and the next priority notification device 2Y to be the same "normal lighting" as before.

The CPU 30 then transmits to the notification device 2 having been given the highest priority, by the priority determination processing this time (the first notification device 2A in the case of FIG. 8) by the first transmitting/receiving portion 31, a highest priority notification command to order an execution of a highest priority notification indicating that the notification device 2 is the highest priority notification device 2X (Step S16: commanding means). The highest priority notification means that the display portion 7 of the highest priority notification device 2X flashes in the same display color as before. The highest priority notification command is a command to change the lighting pattern of the display portion 7. The CPU 30 also transmits to the notification device 2 having been given a lower priority than the highest priority (the sixth notification device 2F in the case of FIG. 8), by the first transmitting/receiving portion 31, a next priority notification command to order an execution of a next priority notification indicating that the notification device 2 is the next priority notification device 2Y (Step S16). The next priority notification means that the display portion 7 of the next priority notification device 2Y blinks in the same display color as before. The next priority notification command is a command to change the lighting pattern of the display portion 7.

When the CPU 30 has transmitted the highest priority notification command to any notification device 2 as described above, the CPU 30 transmits to at least one notification device 2 other than the highest priority notification device 2X, by the first transmitting/receiving portion 31, a highest priority existence notification command to order an execution of a highest priority existence notification indicating the existence of the highest priority notification device 2X (Step S17). The highest priority existence notification means that the notification portion 24 of the notification device 2 other than the highest priority notification device 2X notifies the existence of the highest priority notification device 2X in a mode different from normal lighting and the highest priority notification. The highest priority existence notification in this preferred embodiment is a notification by the buzzer 27. The blinking of the display portion 7, that is, the next priority notification may also be one example of the highest priority existence notification. The CPU 30 may transmit a notification command similar to the highest priority existence notification command to the notification apparatus 16 located close to the highest priority notification device 2X and the network notification apparatus 20. In this case, the notification apparatus 16 and the network notification apparatus 20 issue an alarm similar to the highest priority existence notification. Thereby, the worker, etc., who has received the alarm which the network notification apparatus 20 has issued at a position away from the production site can grasp the existence of the highest priority notification device 2X. The worker, etc., who has received the alarm which the notification apparatus 16 has issued can grasp that the highest priority notification device 2X exists nearby. That is, the workers, etc., who have received the alarms of the notification apparatus 16 and the network notification apparatus 20 are guided to the highest priority notification device 2X. Where the management computer 13 is connected to a public line such as the internet, the CPU 30 may transmit information corresponding to the highest priority existence notification to a portable terminal of the worker, etc., through the public line. Content of the highest priority existence notification (the lighting pattern, the alarm, etc.), a transmission method, etc., can be set appropriately according to circumstances of the production site.

Then, the CPU 30 re-updates the fifth table 39 (Step S18). Specifically, the lighting patterns of the notification devices 2 whose lighting patterns have been ordered to be changed in Steps S16 and S17 are changed to the lighting patterns having been determined in Step S15 in the fifth table 39. FIG. 11 shows one example of the fifth table 39 having been re-updated from the state of FIG. 8. The CPU 30 then transmits a history update command to the storage device 19 (Step S19). Thereby, the operation histories of the relevant notification devices 2 are updated in the storage device 19.

FIG. 12 is a flowchart for explaining an operation example of the notification device 2 after the management computer 13 has transmitted the highest priority notification command (specifically, an operation example related to the change in the lighting pattern of the display portion 7). In the notification device 2 having been given the highest priority by the priority determination process, when the wireless communication unit 15 receives the highest priority notification command (Step S21: YES), the CPU 23 keeps the display color of the display portion 7 as before and changes the lighting pattern to flashing as the highest priority notification (Step S22). Since an abnormality is occurring in the mechanical device M associated with the notification device 2 and the display color is yellow or red, the display portion 7 flashes in yellow or red with the change in the lighting pattern. In this way, the CPU 23 of the notification device 2 having received the highest priority notification command controls the display portion 7 to display the state information which the input portion 22 has accepted from the control device 4, with the first display attribute (the display color in this preferred embodiment) and to display the highest priority notification with the second display attribute (the lighting pattern in this preferred embodiment) different from the first display attribute. The CPU 23 of the notification device 2 executing the highest priority notification appeals to the surroundings that the notification device 2 is the highest priority notification device 2X by the highest priority notification.

The worker who has seen the notification device 2 whose display portion 7 is flashing grasps that the notification device 2 (the first notification device 2A in the case of the fifth table 39 of FIG. 11) is the highest priority notification device 2X, that is, the abnormality in the mechanical device M associated with the notification device 2 should be handled with the highest priority. The operator such as the worker who has arrived at the mechanical device M first operates the operation switch 10 connected to the highest priority notification device 2X. In the highest priority notification device 2X, when the input portion 22 accepts an operation input of the operation switch 10 by the operator (Step S23: YES), the CPU 23 transmits predetermined operation information corresponding to the operation input, and the identification information of the notification device 2 to the management computer 13 by the wireless communication unit 15 (Step S24). The operation information indicates the start of response to the abnormality by the operator such as the worker. The CPU 23 then keeps the display color of the display portion 7 as before and resets the lighting pattern (Step S25). Thereby, the lighting pattern of the display portion 7 is changed from flashing to normal lighting, so that the display portion 7 normally lights up in the same color (yellow or red) as at the time of flashing. When the state information indicating that the abnormality has been eliminated by the action of the worker is transmitted from the control device 4 to the highest priority notification device 2X, the CPU 23 changes the display color of the display portion 7 to green (Step S2 in FIG. 4). Thereby, the display portion 7 normally lights up in green.

Figure 13:
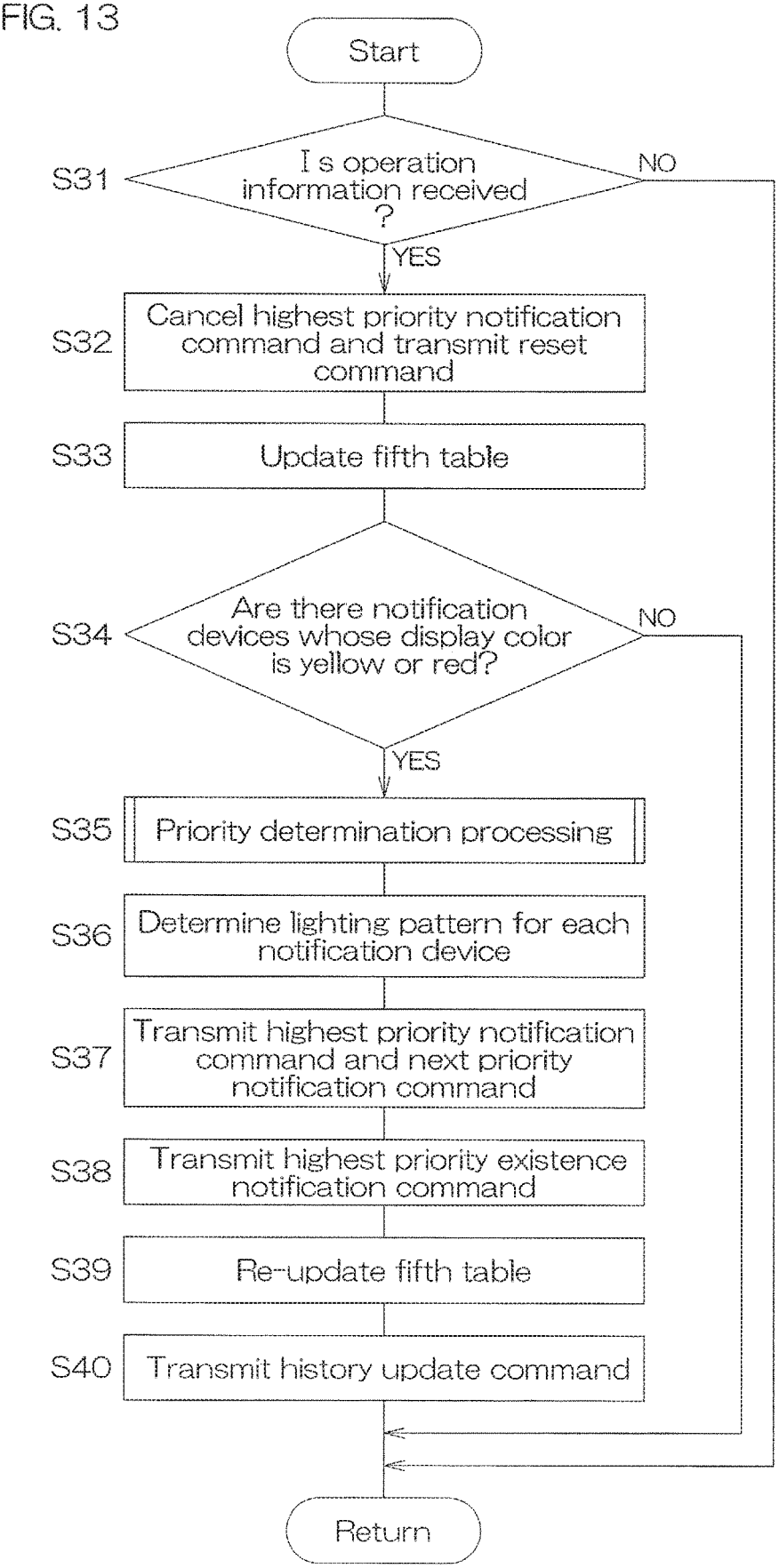
FIG. 13 is a flowchart for explaining an operation example of the management computer.

FIG. 13 is a flowchart for explaining an operation example of the management computer 13 after the highest priority notification device 2X transmits the operation information. In the management computer 13, when the first transmitting/receiving portion 31 receives the operation information from the current highest priority notification device 2X (Step S31: YES), the CPU 30 cancels the highest priority notification command with respect to the highest priority notification device 2X (Step S32). At this time, the CPU 30 transmits a reset command for stopping the next priority notification and the highest priority existence notification with respect to the other notification devices 2 to which the next priority notification command and the highest priority existence notification command have been transmitted.

The CPU 30 then updates, in the fifth table 39, the information on the notification device 2 as the source of the operation information and the notification device 2 as the destination of the reset command (Step S33). Specifically, the CPU 30 changes the lighting patterns of the notification device 2 as the source and the notification device 2 as the destination to normal lighting, and changes the response state of the notification device 2 as the source from "not started" to "starting."

After updating the fifth table 39, the CPU 30 executes the same processing as the above-described Steps S13 to S19 (Steps S34 to S40). Specifically, when there are a plurality of notification devices 2 whose display colors are yellow or red (Step S34: YES), the CPU 30 executes the priority determination processing, thereby determining the priority of the notification devices 2 (Step S35). However, the response state of the notification device 2 having been the highest priority notification device 2X until just before has been changed to "starting" in Step S33. Thus, in the priority determination processing in Step S35, the CPU 30 excludes the notification device 2 having been the highest priority notification device 2X until just before from the target of the priority determination and determines the priority of the plurality of notification devices 2 other than this notification device 2. The notification device 2 having been excluded in the priority determination processing this time is also excluded from the target of the priority determination in the next and subsequent priority determination processing when the response state remains "starting." However, when the response state of the notification device 2 is changed to "not started" with an occurrence of a new event in the mechanical device M corresponding to the notification device 2 (Step S12), the notification device 2 is revived as the target of the priority determination. The CPU 30 then determines the lighting patterns of the notification devices 2 to be targeted for the highest priority notification command, the next priority notification command, and the highest priority existence notification command by the priority determination processing in Step S35 (Step S36). The CPU 30 transmits the highest priority notification command and the next priority notification command with respect to the relevant notification devices 2 (Step S37). The CPU 30 transmits the highest priority existence notification command with respect to the relevant notification device 2 (Step S38). Thereafter, the CPU 30 re-updates the fifth table 39 (Step S39) and transmits the history update command to the storage device 19 (Step S40). In this way, every time the operation information indicating the start of response to the abnormality of the mechanical device M associated with the highest priority notification device 2X is received by the management computer 13, another notification device 2 is designated as a new highest priority notification device 2X. Thus, even if a plurality of abnormalities occurs simultaneously, these abnormalities are appropriately handled in order of highest priority.

Figure 14:
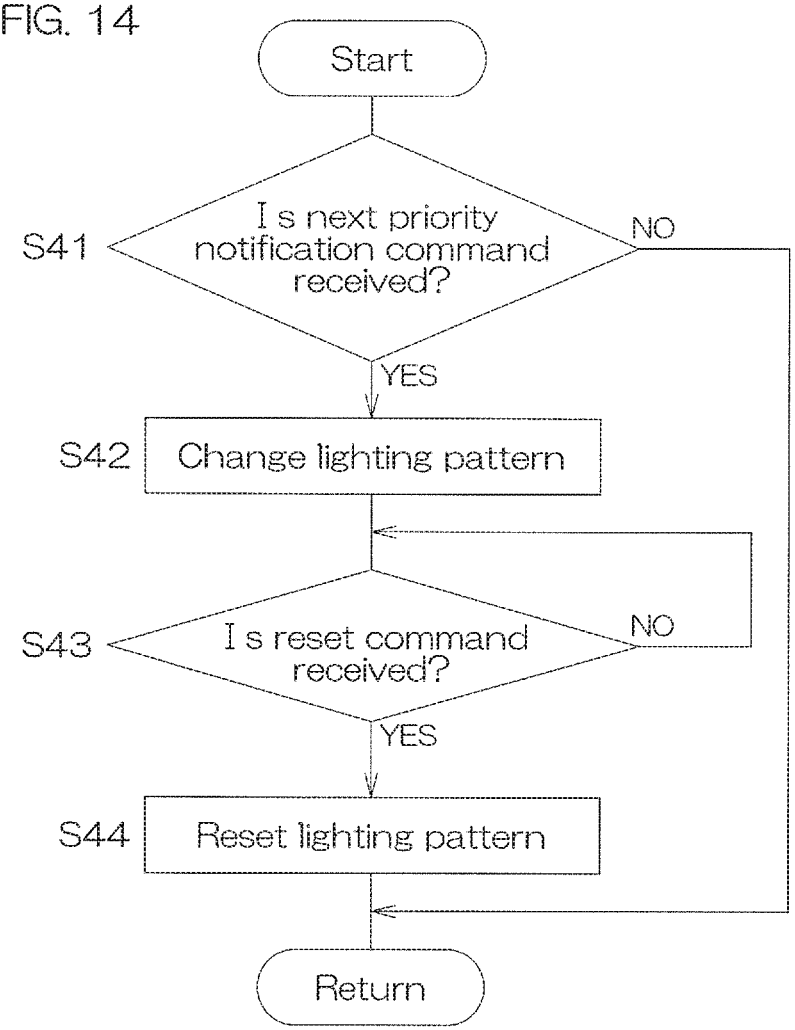
FIG. 14 is a flowchart for explaining an operation example of the notification device.

FIG. 14 is a flowchart for explaining an operation example of the notification device 2 after the management computer 13 transmits the next priority notification command (specifically, an operation example related to a change in the lighting pattern of the display portion 7). In the notification device 2 having been given the priority other than the highest priority by the priority determination processing, when the wireless communication unit 15 receives the next priority notification command (Step S41: YES), the CPU 23 keeps the display color of the display portion 7 as before and changes the lighting pattern to blinking (Step S42). Since an abnormality is occurring in the mechanical device M associated with this notification device 2 and the display color is yellow or red, the display portion 7 blinks in yellow or red with a change in the lighting pattern. The worker who has seen the notification device 2 whose display portion 7 is blinking grasps that the notification device 2 (the sixth notification device 2F in the case of the fifth table 39 of FIG. 11) is the next priority notification device 2Y, that is, there exists an abnormality to be handled with the highest priority aside from the mechanical device M associated with the notification device 2.

When the wireless communication unit 15 then receives the reset command (Step S43: YES), the CPU 23 of the next priority notification device 2Y keeps the display color of the display portion 7 as before and resets the lighting pattern (Step S44). Thereby, the lighting pattern of the display portion 7 is changed from blinking to normal lighting, so that the display portion 7 normally lights up in the same color (yellow or red) as at the time of blinking. However, when the next priority notification device 2Y is given the highest priority by the next priority determination processing (Step S35), the next priority notification device 2Y is upgraded to the highest priority notification device 2X and executes the processing (See FIG. 12) as the highest priority notification device 2X.

Figure 15:
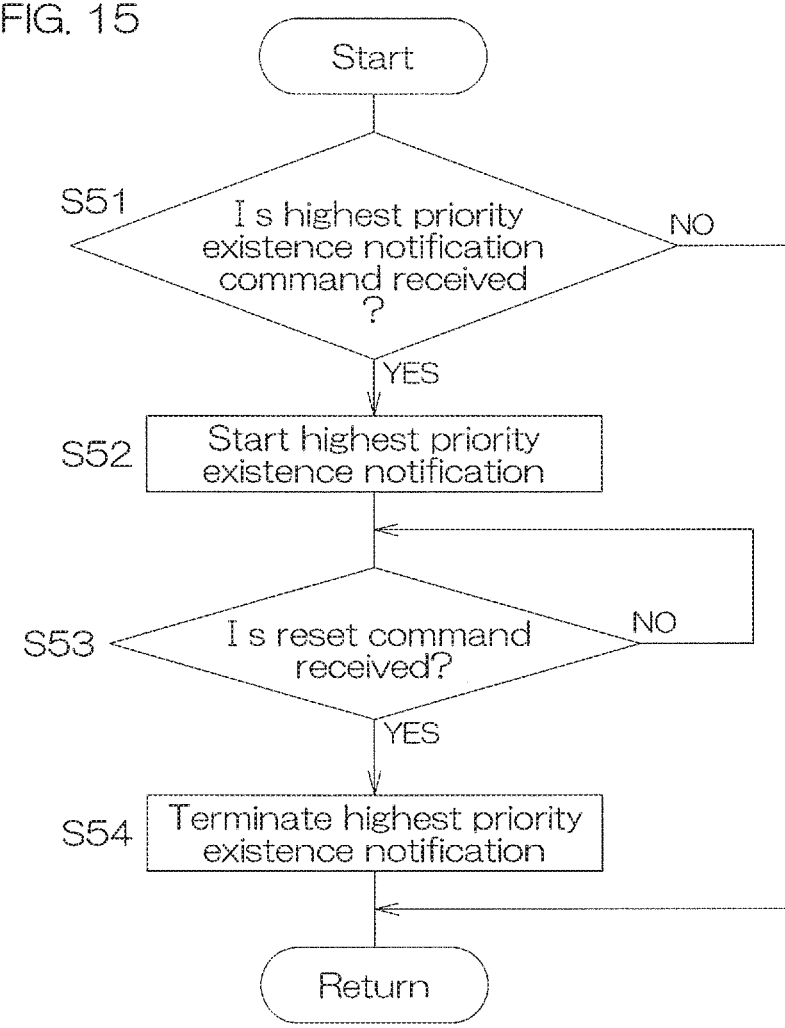
FIG. 15 is a flowchart for explaining an operation example of the notification device.

FIG. 15 is a flowchart for explaining an operation example of the notification device 2 after the management computer 13 transmits the highest priority existence notification command. In the notification device 2 having been given the priority other than the highest priority by the priority determination processing, when the wireless communication unit 15 receives the highest priority existence notification command (Step S51: YES), the CPU 23 starts the highest priority existence notification (Step S52). The worker who has received the highest priority existence notification (the notification by the buzzer 27 in this preferred embodiment) grasps that there exists the highest priority notification device 2X. Then, in the notification device 2 executing the highest priority existence notification, when the wireless communication unit 15 receives the reset command (Step S53: YES), the CPU 23 terminates the highest priority existence notification (Step S54). When the next priority notification is the highest priority existence notification, the processing of Steps S51 to S54 is the same as the processing of Steps S41 to S44, respectively.

Figure 16:
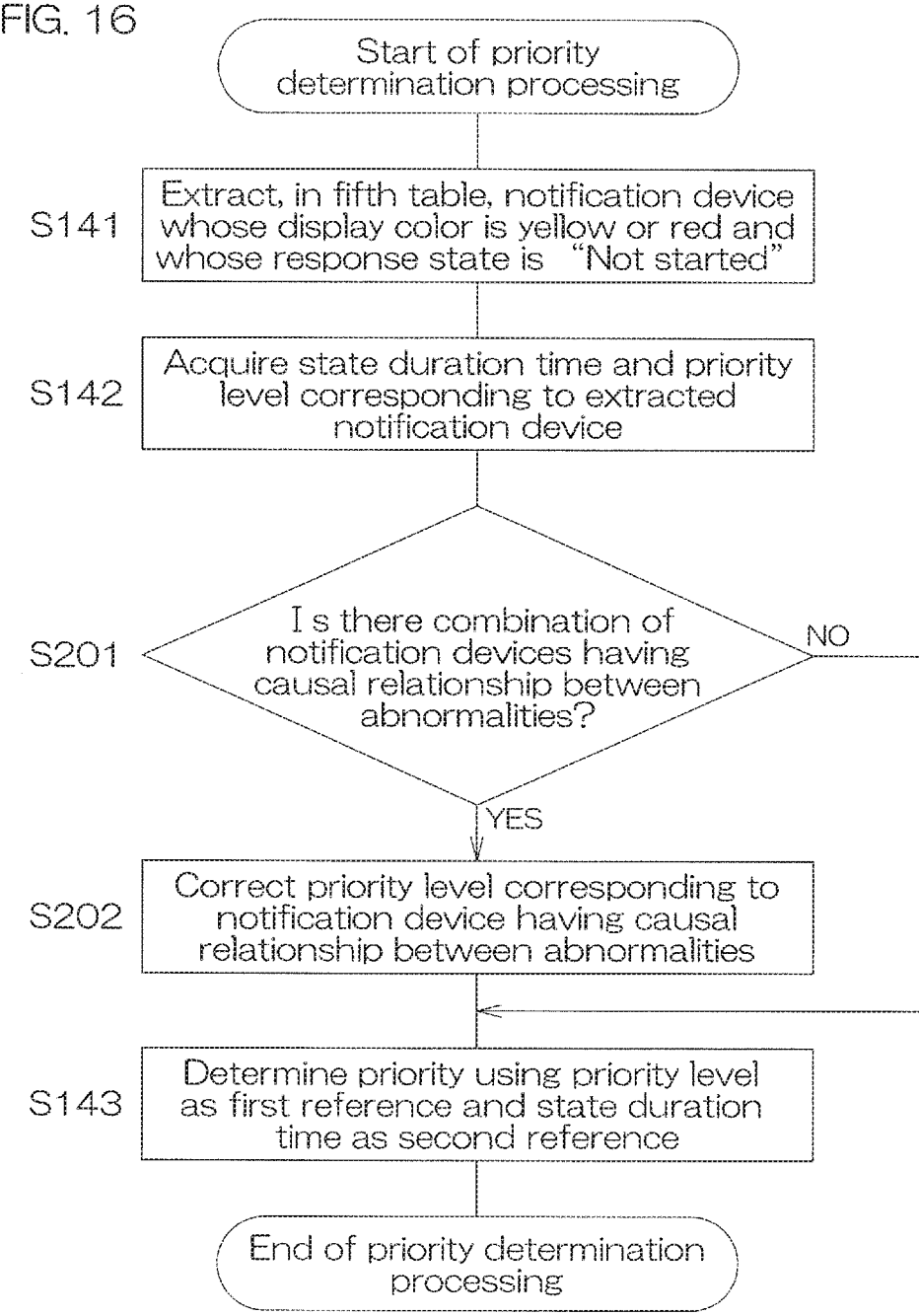
FIG. 16 is a flowchart for explaining a priority determination processing according to a first modification.

Various modifications can be conceived for the priority determination processing. Further, the worker can change the rule 100 according to the modifications by operating the input portion (not shown) provided to the management computer 13. FIG. 16 is a flowchart for explaining a priority determination processing according to the first modification. In the flowchart of FIG. 16, processing steps having the same content as those in the flowchart of FIG. 10 are denoted by the same reference numerals and detailed descriptions of the processing steps will be omitted. The same applies to the second modification described later. In the priority determination processing according to the first modification, the CPU 30 of the management computer 13 first refers to the fifth table 39 and extracts a notification device 2 whose display color is yellow or red and whose response state is "not started" (Step S141) and acquires the state duration time and the priority level corresponding to the notification device 2 (Step S142).

When an abnormality occurs in a plurality of mechanical devices M, these abnormalities may have a causal relationship. For example, assume a case in which products in process at the production site flow from the third mechanical device MC to which the third notification device 2C corresponds to the second mechanical device MB to which the second notification device 2B corresponds through the first mechanical device MA to which the first notification device 2A corresponds in the first group GA. In this case, when an abnormality occurs in the third mechanical device MC, the products in process do not reach the second mechanical device MB and the first mechanical device MA. Thus, an abnormality such as a shortage of parts occurs in the second mechanical device MB and the first mechanical device MA. Therefore, there is a causal relationship between the abnormality of the third mechanical device MC and the abnormalities of the first mechanical device MA and the second mechanical device MB that the abnormality of the third mechanical device MC is "master" and the abnormalities of the first mechanical device MA and the second mechanical device MB are "slave." Such a causal relationship is specified in advance, summarized in a sixth table 40 shown in FIG. 17, and stored in the storage portion 35 of the management computer 13. In the sixth table 40, notification devices 2 corresponding to the plurality of abnormalities constituting the causal relationship, a combination of the display color and the detailed state code indicating each abnormality, a master-slave relationship between the plurality of abnormalities, a priority level corrected value of the combination are registered for each assumed causal relationship pattern. That is, the storage portion 35 stores a combination of information indicating a plurality of abnormalities having the causal relationship out of the information (the display color and the detailed state code) which the plurality of notification devices 2 transmit for each causal relationship pattern.

As one example, in the causal relationship of the first pattern in FIG. 17, an abnormality that the display color is "yellow" and the detailed state code is "3" in the first mechanical device MA to which the first notification device 2A corresponds and an abnormality that the display color is "red" and the detailed state code is "2" in the second mechanical device MB to which the second notification device 2B corresponds occur with an abnormality that the display color is "yellow" and the detailed state code is "1" in the third mechanical device MC to which the third notification device 2C corresponds contributing as a factor. In this case, unless the "master" abnormality in the third mechanical device MC is eliminated, the worker may be unable to handle the "slave" abnormalities in the first mechanical device MA and the second mechanical device MB. Alternatively, when the abnormality in the third mechanical device MC is eliminated, the abnormalities in the first mechanical device MA and the second mechanical device MB may be eliminated automatically. In consideration of these possibilities, the priority levels of the first notification device 2A and the second notification device 2B may be set lower than original priority levels. Here, a priority level corrected value ("3" in this preferred embodiment) lower than the original priority level ("16" in this preferred embodiment) is set in the first notification device 2A of the first pattern. Further, a priority level corrected value ("0" in this preferred embodiment) lower than the original priority level ("19" in this preferred embodiment) is set also in the second notification device 2B of the first pattern.

As another example, in a causal relationship of the second pattern in FIG. 17, an abnormality that the display color is "red" and the detailed state code is "3" in the fifth mechanical device ME to which the fifth notification device 2E corresponds occurs with an abnormality that the display color is "yellow" and the detailed state code is "2" in the sixth mechanical device MF to which the sixth notification device 2F corresponds contributing as a factor. In this case, the priority level of the fifth notification device 2E may be set lower than an original priority level. Thus, a priority level corrected value ("0" in this preferred embodiment) lower than the original priority level ("20" in this preferred embodiment) is set in the fifth notification device 2E of the second pattern.

When the information which the management computer 13 has received from the plurality of notification devices 2 is information indicating a plurality of abnormalities having a causal relationship as just described, the rule 100 for determining the priority of the plurality of notification devices 2 is defined to rank the plurality of notification devices 2 based on the causal relationship between the abnormalities. Thus, the CPU 30 refers to the sixth table 40 for the notification device 2 whose state duration time and priority level have been acquired in Step S142, and checks whether there is a combination of the notification devices 2 having a causal relationship between the abnormalities (Step S201). For example when there is a combination of the notification devices 2 having the causal relationship of the first pattern (a combination of the first notification device 2A to the third notification device 2C in this preferred embodiment) (Step S201: YES), the CPU 30 corrects the priority level corresponding to the first notification device 2A that becomes "slave" in the combination to a priority level corrected value (Step S202). Thereby, the priority level corresponding to the first notification device 2A that becomes "slave" is lowered.

With the priority level corresponding to the "slave" first notification device 2A lowered as just described, the CPU 30 determines the priority of the plurality of notification devices 2 having been extracted this time using the priority level as the first reference and the state duration time as the second reference (Step S143). In the case of FIG. 8, the priority level of the first notification device 2A is reduced from initial "16" to "3" and the priority level of the third notification device 2C remains at initial "14." Thus, the priority of the sixth notification device 2F becomes the first, and the priority of the third notification device 2C becomes the second, and the priority of the first notification device 2A becomes the third, and the priority of the seventh notification device 2G becomes the fourth. When there is no combination of the notification devices 2 having a causal relationship between abnormalities (Step S201: NO), the CPU 30 determines the priority based on the initial priority level and the state duration time (Step S143).

FIG. 18 is a flowchart for explaining a priority determination processing according to the second modification. In the priority determination processing according to the second modification, the CPU 30 of the management computer 13 first refers to the fifth table 39 and extracts a notification device 2 whose display color is yellow or red and whose response state is "not started" (Step S141). Next, the CPU 30 acquires the group G to which the extracted notification device 2 belongs in addition to the state duration time and the priority level corresponding to the extracted notification device 2 (Step S301).

FIG. 19 is a diagram showing a seventh table 41 stored in the storage device 19 in connection with the priority determination processing according to the second modification. In the seventh table 41, an operation history of the notification device 2 is recorded. Specifically, when the management computer 13 receives the combined information and the operation information from the notification device 2, the history update command is transmitted from the management computer 13 to the storage device 19 as described above (Steps S19 and S40). The history update command includes information on the display color, the detailed state code, and the response state of the notification device 2. In the seventh table 41, these pieces of information on the notification device 2 included in the history update command, the information capable of specifying the notification device 2 (the name of the notification device 2 in FIG. 19), and a date and time when the management computer 13 has received the combined information and the operation information from the notification device 2 are stored in order of the date and time.

When an abnormality occurs in a mechanical device M, a time taken from when a worker rushes to the mechanical device M in order to handle the abnormality and operates the operation switch 10 until when the combined information indicating the elimination of the abnormality is received by the management computer 13 is referred to as "response time." The response time can be acquired from the seventh table 41. In the case of FIG. 19, for example, the response time of the abnormality that the display color is "red" and the detailed state code is "3" in the first mechanical device MA associated with the first notification device 2A is 36 minutes. A relationship between an average value of the response time for the abnormality which may occur in each notification device 2 (hereinafter, referred to as "average response time") and the display color and the detailed state code indicating the abnormality is summarized in an eighth table 42 (see FIG. 20) and stored in the storage device 19. The eighth table 42 may be stored in the storage portion 35 of the management computer 13. The content of the eighth table 42 is periodically updated.

The CPU 30 acquires, from the eighth table 42, the average response time for the display color and the detailed state code indicating the abnormality corresponding to the notification device 2 whose state duration time, priority level, and belonging group G have been acquired in Step S301 (Step S302). Then, the CPU 30 calculates a priority point, which is an index indicating the priority of the abnormality, based on the information having been acquired in Steps S301 and S302 (Step S303). Specifically, the following equation (1) for calculating the priority point is stored in the storage portion 35 of the management computer 13, and the CPU 30 substitutes the information having been acquired in Steps S301 and S302 into the equation (1) to calculate the priority point.

$$\text{Priority Point} = \text{Group Point} + \text{Coefficient } a \times \text{Abnormal Level} + \text{Coefficient } b \times \text{Elapsed Time Point} + \text{Coefficient } c \times \text{Response Time Point} \quad \text{Equation (1)}$$

The group point is a point assigned to each of the first group GA to the third group GC, and a higher group point is set for a group G having a higher priority. The elapsed time point is a point optionally set to be higher as the state duration time is longer. When a value after the decimal point is rounded down in an operation value of the following equation (2), the elapsed time point is acquired. The response time point is a point set to be higher as the response time is longer. When a value after the decimal point is rounded down in an operation value of the following equation (3), the elapsed time point is acquired. The coefficients a to c are values optionally set. In the equation (1), the priority point becomes higher as the priority of the group G is higher, the abnormal level is higher, and the state duration time and the response time are longer. However, an abnormality whose response time is short (an abnormality which can be eliminated immediately) may be given priority depending on the operation. In that case, the coefficient c may be determined so that the priority point becomes higher as the response time is shorter. As one example, the coefficient c may be a negative value.

$$\text{Elapsed Time Point} = \text{Reference Value } d + \text{State Duration Time}/\text{Coefficient } e \quad \text{Equation (2)}$$

$$\text{Response Time Point} = \text{Reference Value } f + \text{Average Response Time}/\text{Coefficient } g \quad \text{Equation (3)}$$

The reference values d and f and the coefficients e and g are values optionally set. The content of the equations (1) to (3) can be changed appropriately.

The CPU 30 determines the priority among the notification devices 2 on the basis of the priority points having been calculated for each occurring abnormality (Step S304). In this case, the higher the priority point is, the higher the priority is.

As just described, according to this preferred embodiment, in each notification device 2, when the acceptance portion 21 accepts an input of information (state information of the corresponding mechanical device M) in response to, for example, an occurrence of some event, the CPU 23 controls the notification portion 24 to make a notification according to the state information (Step S2). Therefore, a person who has received the notification can grasp the occurrence of the event. The wireless communication unit 15 then transmits information (combined information) corresponding to the state information to the management computer 13 (Step S4). In the management computer 13, when the first transmitting/receiving portion 31 receives the information having been transmitted by the wireless communication units 15 of the plurality of the notification devices 2, the CPU 30 applies the information to the rule 100 stored in the storage portion 35 and determines the priority of the plurality of notification devices 2 (Step S14). The CPU 30 then transmits the highest priority notification command to the notification device 2 having been given the highest priority (Step S16). In the notification device 2 having received the highest priority notification command by the wireless communication unit 15, the CPU 23 controls the notification portion 24 to make a notification according to the highest priority notification command, and thus the notification portion 24 executes the highest priority notification indicating that the notification device 2 is the highest priority notification device 2X (Step S22). Therefore, for example, when a plurality of events requiring action occurs simultaneously, the worker can grasp by the highest priority notification without instructions from a supervisor that the worker should handle the event related to the highest priority notification device 2X with the highest priority, so that the worker can immediately set about handling the event. Thereby, the plurality of abnormalities simultaneously occurring can be eliminated efficiently. In this manner, the notification system 1 capable of promptly and properly providing the information on the priority can be realized.

The rule 100 for determining the priority of the plurality of notification devices 2 is defined to rank the plurality of notification devices 2 based on the information which the wireless communication units 15 of the notification devices 2 transmit to the management computer 13. Therefore, the CPU 30 of the management computer 13 applies the information having been transmitted by the wireless communication units 15 of the plurality of notification devices 2 to the rule 100 and ranks the notification devices 2, thereby being able to determine the priority of the plurality of notification devices 2. Accordingly, the plurality of notification devices 2 can be properly ranked based on the information which the acceptance portions 21 of the plurality of notification devices 2 accept from the control device 4, and the information on the priority can be properly provided.

The rule 100 for determining the priority of the plurality of notification devices 2 may be defined to rank the plurality of notification devices 2 based on the information on the degree of urgency. In this case, the CPU 30 of the management computer 13 applies the information on the degree of urgency specified from the information having been transmitted by the wireless communication units 15 of the plurality of notification devices 2 to rule 100 and ranks the plurality of notification devices 2. Thereby, the CPU 30 can properly determine the priority of the plurality of notification devices 2 according to the degree of urgency, and thus proper information on the priority can be provided.

The rule 100 for determining the priority of the plurality of notification devices 2 may be defined to rank the plurality of notification devices 2 based on the group G to which each notification device 2 belongs. In this case, the CPU 30 of the management computer 13 specifies the group G to which each notification device 2 belongs from the information having been transmitted by the wireless communication units 15 of the plurality of notification devices 2 and ranks the plurality of notification devices 2 based on the specified group G. Thereby, the CPU 30 can properly determine the priority of the plurality of notification devices 2 according to the group G to which each notification device 2 belongs.

The rule 100 for determining the priority of the plurality of notification devices 2 may be defined to rank the plurality of notification devices 2 based on a causal relationship between a plurality of abnormalities as in the first modification (see FIG. 16). In this case, the CPU 30 of the management computer 13 ranks the plurality of notification devices 2 based on the causal relationship between abnormalities specified from the information having been transmitted by the wireless communication units 15 of the plurality of notification devices 2. Thereby, the CPU 30 can properly determine the priority of the plurality of notification devices 2 according to the causal relationship between abnormalities.

When the CPU 30 of the management computer 13 has transmitted the highest priority notification command to any notification device 2, the CPU 30 transmits, to at least one of the notification devices 2 having been given the priority other than the highest priority by the CPU 30, the highest priority existence notification command to order an execution of the highest priority existence notification indicating the existence of the highest priority notification device 2X (Step S17). With this configuration, in the notification device 2 having received the highest priority existence notification command by the wireless communication unit 15, the CPU 23 controls the notification portion 24 to make a notification according to the highest priority existence notification command, so that the notification portion 24 executes the highest priority existence notification indicating the existence of the highest priority notification device 2X (Step S52). The worker, etc., who comes in contact with the highest priority existence notification learns that the highest priority notification has been made by another notification device 2. Thus, the fact that the highest priority notification has been made can be informed to a worker, etc., who has not come in contact with the highest priority notification by the highest priority notification device 2X. As a result, an early response, etc., to the event notified by the highest priority notification device 2X can be promoted.

When an operator such as a worker arrives at the highest priority notification device 2X in order to handle the event related to the highest priority notification device 2X and operates the operation switch 10, the input portion 22 accepts an operation input to the operation switch 10 and the wireless communication unit 15 transmits the operation information to the management computer 13 in the highest priority notification device 2X (Step S24). In the management computer 13, when the first transmitting/receiving portion 31 receives the operation information from the highest priority notification device 2X, the CPU 30 cancels the highest priority notification command with respect to the highest priority notification device 2X (Step S32), excludes the highest priority notification device 2X, and predetermines the priority of the plurality of notification devices 2 (Step S35). Thereby, for example, when an event to be notified by priority is occurring in the plurality of notification devices 2 simultaneously, another notification device 2 makes the highest priority notification instead of the notification device 2 having been the highest priority notification device 2X until just before. Thus, the worker can grasp the highest priority notification device 2X to be handled, etc., next by this highest priority notification, so that the worker can immediately set about handling, etc., the event related to this highest priority notification device 2X.

The CPU 30 of the management computer 13 transmits, to a notification device 2 to which the CPU 30 has given the lower priority than the highest priority, a next priority notification command to order an execution of the next priority notification indicating that the notification device 2 is the next priority notification device 2Y (Step S16). With this configuration, in the notification device 2 having received the next priority notification command by the wireless communication unit 15, the CPU 23 controls the notification portion 24 to make a notification according to the next priority notification command, so that the notification portion 24 executes the next priority notification indicating that the notification device 2 is the next priority notification device 2Y (Step S42). Therefore, the worker can grasp that there exists the highest priority notification device 2X other than the notification device 2 executing the next priority notification. Thereby, the worker can find the highest priority notification device 2X and more immediately set about handling, etc., the event related to the highest priority notification device 2X. Since the worker already grasps the existence of the next priority notification device 2Y, the worker can immediately set about handling, etc., the event related to the next priority notification device 2Y after handling, etc., the event related to the highest priority notification device 2X. In this way, the worker can handle events, etc., in order of highest priority.

In the display portion 7 of the notification device 2 having received the highest priority notification command, the information which the acceptance portion 21 has accepted and the highest priority notification are displayed with mutually different display attributes. Accordingly, a person who has seen the display portion 7 of the highest priority notification device 2X can distinctively visually recognize both the information which the acceptance portion 21 has accepted and the highest priority notification.

In the management computer 13, when the information which the first transmitting/receiving portion 31 has received is information indicating an abnormality (Step S13: YES), the CPU 30 executes the determination of the priority of the plurality of notification devices 2. With this configuration, in the management computer 13, when the first transmitting/receiving portion 31 receives information in response to the occurrence of an abnormality, the CPU 30 updates the priority. Thus, the notification device 2 having become the highest priority notification device 2X based on the updated priority executes the highest priority notification, by which the worker can immediately set about handling, etc., the event related to the highest priority notification device 2X having been properly determined according to the latest situation.

As described above, the preferred embodiments of the present invention have been described. However, the present invention can be carried out in further other forms.

(1) For example, instead of the configuration that the state information of the mechanical device M is transmitted from the control device 4 to the notification device 2 and the combined information corresponding to the state information is transmitted to the management computer 13, a worker who has grasped an abnormality may operate a device such as a switch, by which the information indicating the abnormality may be transmitted to the management computer 13 through the notification device 2.

(2) The highest priority notification and the next priority notification are executed by the lighting pattern of the display portion 7 of the notification device 2. Specifically, flashing is the highest priority notification and blinking is the next priority notification. As a modification of the configuration that the lighting pattern differs depending on the priority as described above, the priority may be expressed by the number of blinkings of the display portion 7, for example. In this case, the display portion 7 may periodically repeat a one-time short-time lighting and a one-time short-time extinguishing as the highest priority notification and periodically repeat a two-time short-time lighting and a one-time short-time extinguishing as the next priority notification. Further, the highest priority notification and the next priority notification may be executed by the notification by the buzzer 27 and may be executed by a combination of the lighting pattern and the buzzer 27. In this case, the priority may be expressed by a notification sound, etc., of the buzzer 27. The notification sound of the buzzer 27 may include a voice.

(3) The reset of the lighting pattern in the highest priority notification device 2X (Step S25 in FIG. 12) may be executed according to, for example, an elapse of a predetermined time from a change in the lighting pattern accompanying the highest priority notification command (Step S22) instead of being executed according to the operation input of the operation switch 10 by the operator. The reset of the lighting pattern in the next priority notification device 2Y (Step S44 in FIG. 14) may be executed according to, for example, an elapse of a predetermined time from a change in the lighting pattern accompanying the next priority notification command (Step S42) instead of being executed according to reception of the reset command from the management computer 13.

(4) In the above-described preferred embodiments, in the notification device 2, the combined information is transmitted from the notification device 2 to the management computer 13 at a time when the state information input from the control device 4 changes (Steps S1 to S3). Without limiting to this timing, the combined information may be periodically transmitted from the notification device 2 to the management computer 13. In that case, the combined information may be transmitted not only from the notification device 2 corresponding to the event to be handled but also from all the notification devices 2 simultaneously. The priority determination processing in the management computer 13 may be periodically executed instead of being executed at the time when the management computer 13 has received the combined information and the operation information from the notification devices 2.

(5) As the notification device 2, a configuration is also possible in which the display portion 7 includes only any of the lower display portion 71, the middle display portion 72, and the upper display portion 73 instead of the above-described stacked signal light. The light source 8 in this case is a full color light source or multi-color light source capable of emitting light of a plurality of colors. Similar to the above-described preferred embodiments, the display color of the display portion 7 is any of green, yellow, and red. The lighting pattern of the display portion 7 is any of normal lighting, blinking, and flashing. The operation switch 10 may be provided on a surface (a top surface, for example) of the globe 9 of the corresponding notification device 2 and accordingly be integrated with the notification device 2.

While preferred embodiments of the present invention are described in detail above, these are merely specific examples used to clarify the technical contents of the present invention. The present invention should not be interpreted as being limited to these specific examples and the scope of the present invention is limited only by the appended claims.

REFERENCE SIGNS LIST

1: Notification system
2: Notification device
2X: Highest priority notification device
2y: Next priority notification device
7: Display portion
10: Operation switch
13: Management computer
15: Wireless communication unit
21: Acceptance portion
22: Input portion
23: CPU
24: Notification portion
30: CPU
31: First transmitting/receiving portion
35: Storage portion
100: Rule
G: Group

The invention claimed is:
1. A notification system including a plurality of notification devices and a management computer communicatively connected to the plurality of notification devices, wherein
each notification device includes
a notification portion,
an information accepting unit to accept an information input,
a command receiving unit to receive a command transmitted from the management computer,
a notification control unit to control the notification portion to make a notification according to the information which the information accepting unit has accepted and the command which the command receiving unit has received, and a transmitting unit to transmit information corresponding to the information which the information accepting unit has accepted to the management computer, and the management computer includes a receiving unit to receive the information having been transmitted by the transmitting unit of the plurality of notification devices, a storing unit to store a rule for determining a priority of the plurality of notification devices, a determining unit to apply the information which the receiving unit has received to the rule and determine a priority of the plurality of notification devices, and a commanding unit to transmit, to a notification device having been given a highest priority by the determining unit, a highest priority notification command to order an execution of a highest priority notification indicating that the notification device is the highest priority notification device.

2. The notification system according to claim 1, wherein the rule is defined to rank the plurality of notification devices based on the information which the transmitting unit of the notification devices transmit to the management computer.

3. The notification system according to claim 2, wherein the information which the transmitting unit of the notification devices transmit to the management computer includes information capable of specifying a degree of urgency, and the rule is defined to rank the plurality of notification devices based on the information on the degree of urgency.

4. The notification system according to claim 2, wherein the management computer classifies the plurality of notification devices so that each notification device belongs to any of a plurality of groups, and the information which the transmitting unit of the notification devices transmit to the management computer includes information capable of specifying the groups to which the notification devices belong, and the rule is defined to rank the plurality of notification devices based on the group to which each notification device belongs.

5. The notification system according to claim 2, wherein the storing unit stores a combination of information indicating a plurality of abnormalities having a causal relationship out of the information which the transmitting unit of the plurality of notification devices transmit, and when the information which the receiving unit has received from the transmitting unit of the plurality of notification devices is information indicating a plurality of abnormalities having a causal relationship, the rule is defined to rank the plurality of notification devices based on the causal relationship.

6. The notification system according to claim 1, wherein when the commanding unit has transmitted the highest priority notification command to any notification device, the commanding unit transmits, to at least one of the notification devices other than the highest priority notification device, a highest priority existence notification command to order an execution of a highest priority existence notification indicating an existence of the highest priority notification device.

7. The notification system according to claim 1, wherein the notification device further includes an operation input accepting unit to accept an operation input to an operation switch operated by an operator, and the transmitting unit of the notification device transmits predetermined operation information to the management computer when the operation input accepting unit of the notification device accepts the operation input, and when the receiving unit of the management computer receives the operation information from the highest priority notification device, the commanding unit cancels the highest priority notification command with respect to the highest priority notification device and the determining unit excludes the highest priority notification device and determines the priority of the plurality of notification devices.

8. The notification system according to claim 1, wherein the commanding unit transmits, to a notification device having been given a lower priority than the highest priority by the determining unit, a next priority notification command to order an execution of a next priority notification indicating that the notification device is a next priority notification device.

9. The notification system according to claim 1, wherein the notification portion includes a display portion to variably display information, and the notification control unit of the notification device having received the highest priority notification command controls the display portion to display the information which the information accepting unit has accepted with a first display attribute and display the highest priority notification with a second display attribute different from the first display attribute.

10. The notification system according to claim 1, wherein when the information which the receiving unit has received is information indicating an abnormality, the determining unit executes a determination of priority of the plurality of notification devices.

* * * * *